United States Patent
Shen et al.

(10) Patent No.: US 11,637,905 B2
(45) Date of Patent: Apr. 25, 2023

(54) METHOD FOR DEPLOYING SERVICE IN CLUSTER SYSTEM, PROGRAM, AND SYSTEM

(71) Applicant: Konica Minolta Inc., Tokyo (JP)

(72) Inventors: Yuchen Shen, Itami (JP); Nordes Menard-Lamarre, Takarazuka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/333,606

(22) Filed: May 28, 2021

(65) Prior Publication Data

US 2021/0385288 A1    Dec. 9, 2021

(30) Foreign Application Priority Data

Jun. 4, 2020 (JP) .............................. JP2020-097641

(51) Int. Cl.
*H04L 67/51* (2022.01)
*H04L 67/10* (2022.01)

(52) U.S. Cl.
CPC .............. *H04L 67/51* (2022.05); *H04L 67/10* (2013.01)

(58) Field of Classification Search
CPC ...................................................... H04L 67/10
See application file for complete search history.

(56) References Cited

U.S. PATENT DOCUMENTS

| | | | | |
|---|---|---|---|---|
| 10,789,267 B1 * | 9/2020 | Dhoolam | ................ | G06F 16/27 |
| 2007/0124446 A1 * | 5/2007 | Coulthard | .............. | G06Q 10/06 709/207 |
| 2011/0029673 A1 | 2/2011 | Jaisinghani | | |
| 2011/0138027 A1 * | 6/2011 | Friedmann | .......... | H04L 65/1063 709/223 |
| 2013/0159461 A1 * | 6/2013 | Al Faruque | ............. | H04L 67/51 709/217 |
| 2016/0188425 A1 * | 6/2016 | Duggana | ................ | G06F 11/203 714/4.11 |
| 2016/0323161 A1 * | 11/2016 | Cuervo Laffaye | .......................... | H04L 67/1001 |

FOREIGN PATENT DOCUMENTS

| | | |
|---|---|---|
| JP | 7-200441 A | 8/1995 |
| JP | 2005-43962 A | 2/2005 |
| JP | 2011-18223 A | 1/2011 |
| JP | 2013-89093 A | 5/2013 |
| JP | 2019-164621 A | 9/2019 |

OTHER PUBLICATIONS

Extended European Search Report (EESR) dated Oct. 29, 2021 for corresponding European Patent Application No. 21175984.0.

* cited by examiner

*Primary Examiner* — Nicholas R Taylor
*Assistant Examiner* — Sm Z Islam
(74) *Attorney, Agent, or Firm* — Rankin, Hill & Clark LLP

(57) ABSTRACT

There is provided a method for deploying a service to a cluster system, and the method includes: obtaining a first run level of a first node; obtaining a second run level of a second node; obtaining a required run level for the service; comparing the required run level with the first and second run levels; determining whether or not the service is deployable to each of the first and second nodes on the basis of a result of the comparing; and updating at least one of the first and second run levels on the basis of deployment of the service to at least one of the first and second nodes.

14 Claims, 22 Drawing Sheets

METHOD FOR DEPLOYING SERVICE IN CLUSTER SYSTEM, PROGRAM, AND SYSTEM

The entire disclosure of Japanese patent Application No. 2020-097641, filed on Jun. 4, 2020, is incorporated herein by reference in its entirety.

BACKGROUND

Technological Field

The present disclosure relates to a method for deploying services in a cluster system, and more specifically to control of deployment order of services.

Description of the Related Art

In recent years, declarative deployment has become the mainstream of application deployment (which may include installation and/or launching) in cluster systems. As a cluster system that supports the declarative deployment, for example, Kubernetes has been known. The declarative deployment is different from the conventional command deployment that uses commands or scripts, and controls processing such as service deployment or termination on the basis of a manifest file that describes meta-information such as the number of replicas of a service.

By adopting a cluster system that supports the declarative deployment, an administrator can easily create a configuration for deploying services to the cluster system without knowledge of commands or scripts. Meanwhile, the cluster system that supports the declarative deployment may not provide a detailed method of configuration using scripts. In that case, the administrator cannot easily create a configuration for deploying each service in a specific order on the basis of the dependency between services. In view of the above, there is a need for a technique for sequentially deploying services to a cluster system on the basis of the dependency between the services.

Regarding the service deployment, for example, JP 2013-089093 A discloses an activation order management method of a virtual server in which "an application activation confirming function part confirms multiple times whether or not virtual servers are powered on from one with a smaller order number in activation information extracted from an activation order database, confirms multiple times whether or not a communication port opened by an application program in the virtual server confirmed to be powered on multiple times is communicable, and activates a virtual server with the next order number after confirming that another virtual server with the next larger order number is powered on and its port is communicable, thereby activating a following application program after completing activation of a preceding application program" (see [Abstract]).

In addition, other techniques related to the service deployment are disclosed in, for example, JP 2005-043962 A, JP 2011-018223 A, JP H7-200441 A, and JP 2019-164621 A.

According to the techniques disclosed in JP 2013-089093 A, JP 2005-043962 A, JP 2011-018223 A, JP H7-200441 A, and JP 2019-164621 A, a deployment order of services cannot be determined on the basis of the dependency between the services. Therefore, there is a need for a technique for determining a deployment order of services on the basis of the dependency between the services.

SUMMARY

The present disclosure has been conceived in view of the background described above, and an object in one aspect is to provide a technique for determining a deployment order of services on the basis of the dependency between the services.

To achieve the abovementioned object, according to an aspect of the present invention, there is provided a method for deploying a service to a cluster system, and the method reflecting one aspect of the present invention comprises: obtaining a first run level of a first node; obtaining a second run level of a second node; obtaining a required run level for the service; comparing the required run level with the first and second run levels; determining whether or not the service is deployable to each of the first and second nodes on the basis of a result of the comparing; and updating at least one of the first and second run levels on the basis of deployment of the service to at least one of the first and second nodes.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the technical idea according to the present invention will be described with reference to the drawings. However, the scope of the invention is not limited to the disclosed embodiments. The same components are denoted by the same reference signs in the following descriptions. Names and functions thereof are also the same. Detailed descriptions thereof will not be repeated, accordingly <A. Cluster System>

Figure 1:
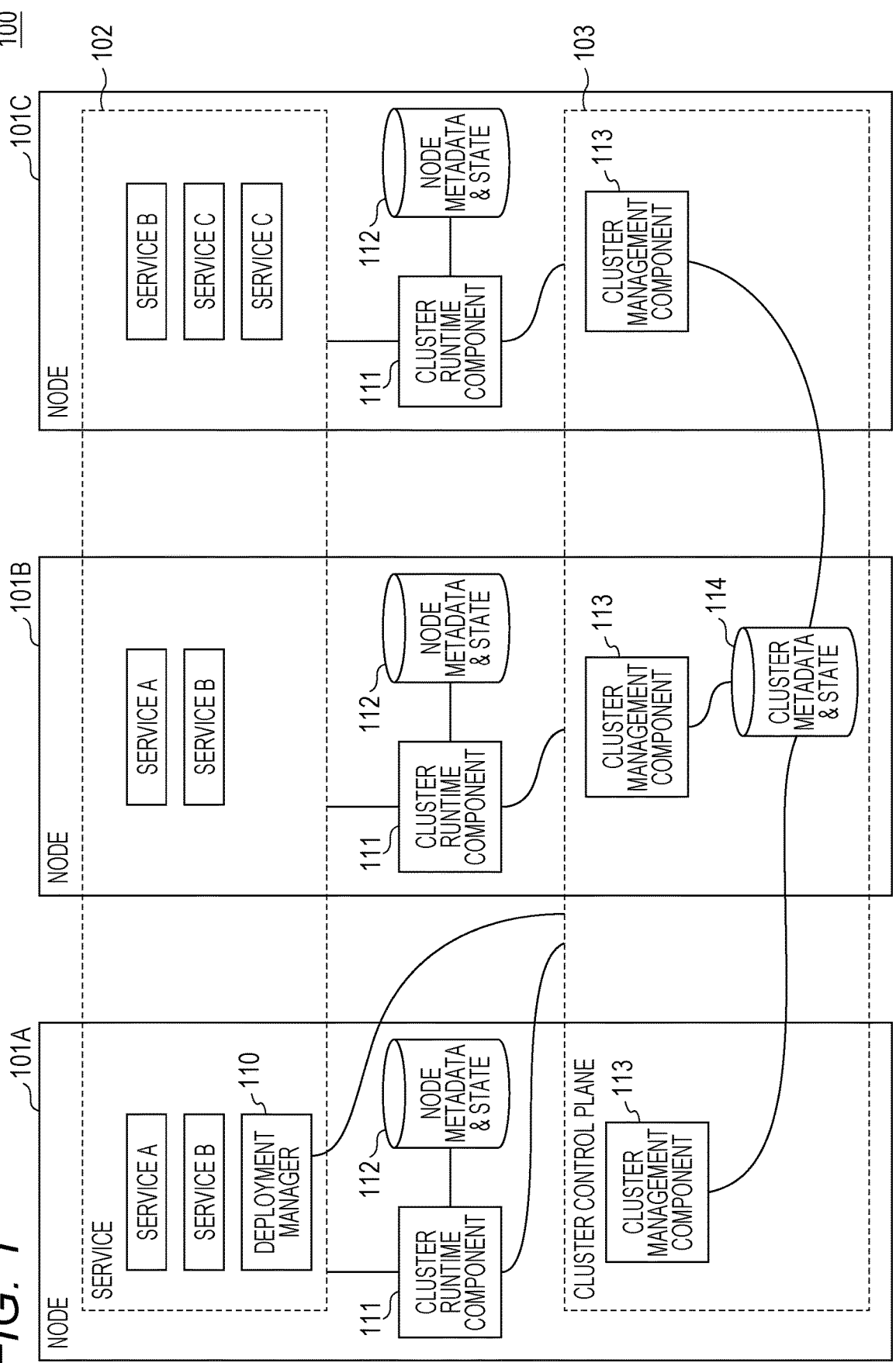
FIG. 1 is a diagram illustrating an exemplary configuration of a cluster system according to an embodiment.

FIG. 1 is a diagram illustrating an exemplary configuration of a cluster system 100 according to the present embodiment. Constituent elements of the cluster system will be described with reference to FIG. 1. The cluster system 100 includes a plurality of nodes 101A, 101B, and 101C (collectively referred to as "node 101"). The node 101 is a computing node in the cluster system 100. The node 101 may include a server device, a virtual server device, or the like. An operating system (OS) operates in each node 101, and a service deployed on the OS is executed.

The cluster system 100 includes a service 102 and a cluster control plane 103. The service 102 refers to overall services deployed to each node 101. The service 102 may include an application that runs on the OS, a container in a virtual environment, and the like.

The cluster control plane 103 is a function group for providing functions (mainly starting and terminating services, etc.) of the cluster system 100, which may be arranged in a distributed manner among a plurality of nodes 101. In other words, the cluster system 100 is a huge system including a large number of computational resources. The cluster system 100 illustrated in FIG. 1 is an example, and the configuration of the cluster system 100 is not limited thereto. In one aspect, the cluster system 100 may include the optional number of nodes 101.

The cluster system 100 is capable of deploying a service to each node 101. A "service" is an application that runs in individual nodes 101. "Deploying" indicates installing or installing and launching an application in the node 101.

The cluster system 100 deploys the service to any of the nodes 101 on the basis of a manifest file created for each service. A "manifest file" indicates a configuration file containing metadata such as the number of replicas (number of deployments/number of instances to be created) of the service. In addition, the manifest file contains a required run level of the service. A "required run level" indicates a value assigned to each service, and is used by a deployment manager 110 to compare with a run level of the entire cluster system 100 or a run level of individual nodes 101. A "run level" is set for the entire cluster system 100 or for each node 101, and is determined on the basis of the highest required run level among the required run levels of one or more services running in each node 101. In a case where the service is not running in the node 101, the run level of the node 101 is the lowest value (e.g., 0). A service can only be deployed to a node running at a run level equal to or higher than the required run level assigned to itself. The run level and the required run level will be described later with reference to FIG. 2.

A user does not need to specify the node 101 to start the service, and only needs to install the manifest file in the cluster system 100. From the user's point of view, it seems that a huge server automatically start the service on the basis of the required run level by only installing a configuration file (manifest file) in the huge server (cluster system 100). In one aspect, the user may transmit a manifest file from the user's own terminal or the like to the cluster system 100. In one aspect, the deployment of the service may start on the basis of the manifest file being populated M a cluster management component 113.

In order to deploy the service to each node 101 on the basis of the manifest file, the cluster system 100 includes the deployment manager 110, a cluster runtime component 111, a node metadata & state 112, the cluster management component 113, and a cluster metadata & state 114.

The deployment manager 110 controls the order of deployment of the services to the node 101. The deployment manager 110 itself is a service that runs in the node 101. It is sufficient if the deployment manager 110 runs in any one of the nodes 101. While the deployment manager 110 is deployed to the node 101A in the example illustrated in FIG. 1, it is capable of controlling the deployment order of the services to all the nodes 101. The control of the deployment order will be described later with reference to FIG. 3 and later.

The deployment manager 110 can obtain a status of the cluster system 100, each node 101, or each service by communicating with the cluster control plane 103. Moreover, the deployment manager 110 can set a filter for controlling the deployment order of the services in the cluster control plane 103.

The cluster runtime component 111 deploys or terminates the service that runs in the cluster system 100. The cluster runtime component 111 runs on the OS of each node 101, communicates with the OS or a virtual environment of the node 101 in which the component itself is running, and controls a life cycle of the service. The cluster runtime component 111 notifies the cluster control plane 103 of the state of the node. Furthermore, the cluster runtime component 111 can accept a request from the service.

The node metadata & state 112 is a database referenced by the cluster runtime component 111, which stores the metadata and state of each node 101. In one aspect, the node metadata & state 112 may store run levels of individual nodes 101 (hereafter referred to as "node run level").

The cluster management component 113 manages the state of the entire cluster system 100, receives a declarative instruction (manifest file configuration, etc.) made by the user, and transmits, to the cluster runtime component 111, an instruction regarding service deployment or termination. Furthermore, the cluster management component 113 may update the node metadata & state 112.

The cluster management component 113 may be executed in any of the nodes 101, and may be arranged in a distributed manner in a plurality of the nodes 101. In a case where the cluster management component 113 is arranged in a distributed manner in the plurality of nodes 101, all the instances are synchronized.

The cluster metadata & state 114 is a database referenced by the cluster management component 113. The cluster metadata & state 114 stores a manifest file for each service referenced by the deployment manager 110 or the cluster management component 113. In one aspect, the cluster metadata & state 114 may further store information, states, and the like associated with the cluster system 100. Furthermore, in another aspect, the cluster metadata & state 114 may store a run level of the entire cluster (hereinafter referred to as "cluster run level").

The cluster metadata & state 114 may be executed in any of the nodes 101, and may be arranged in a distributed manner in the plurality of nodes 101. Furthermore, the cluster metadata & state 114 is not required to be executed in the node 101 same as that of the cluster management component 113.

In one aspect, the cluster system 100 may have both of the node run level and the cluster run level. In another aspect, the cluster system 100 may have only one of the node run level and the cluster run level.

<B. Required Run Level for Service and Node Run Level>

Figure 2:
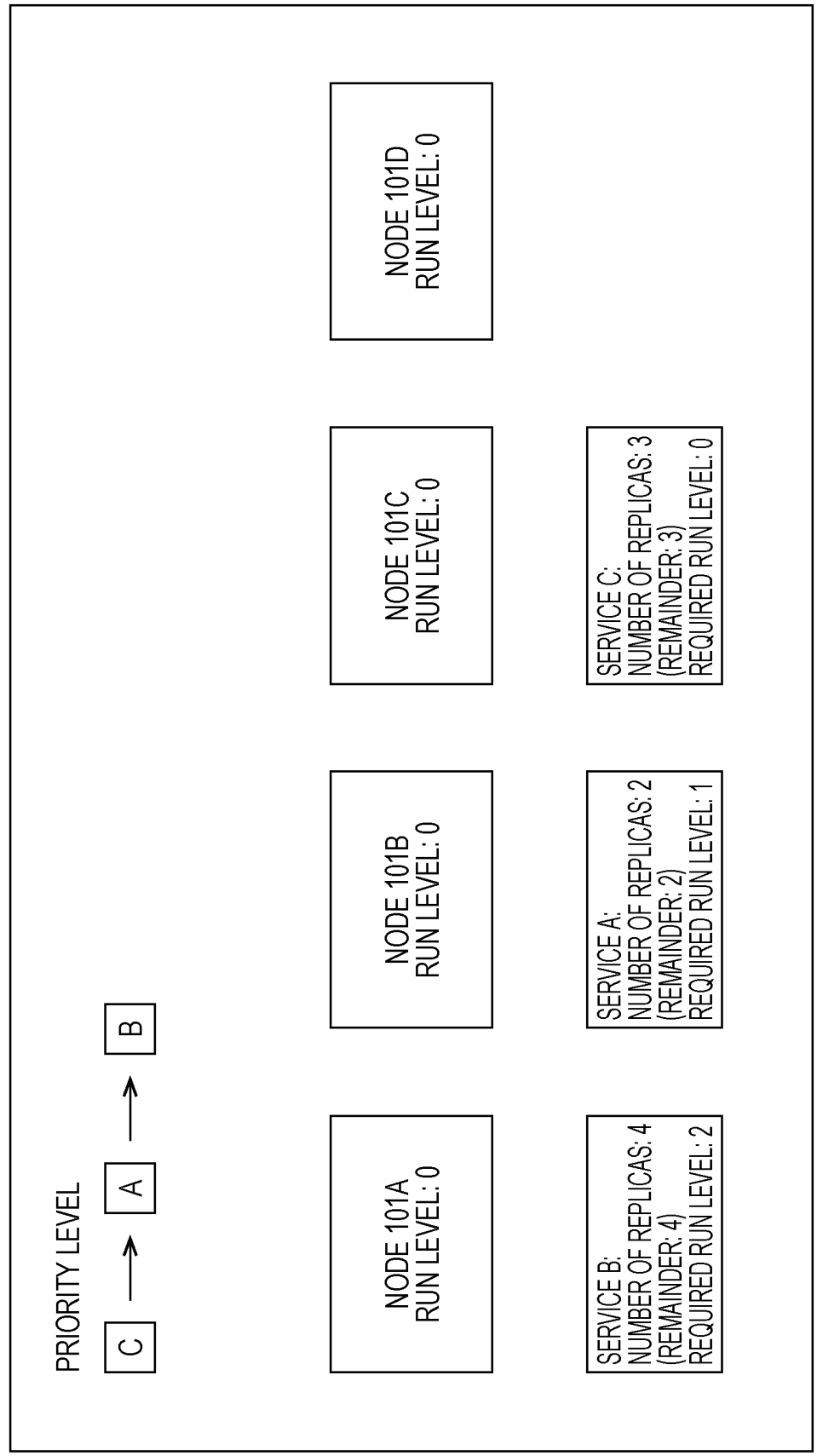
FIG. 2 is a diagram illustrating an example of nodes and services in the cluster system.

FIG. 2 is a diagram illustrating an example of the nodes 101 and the services in the cluster system 100. A relationship between the run level of each node 101 and the required run level set for the service will be described with reference to FIG. 2.

It is assumed that the cluster system 100 includes four nodes 101A to 101D. In addition, it is assumed that there are services A to C to be deployed. Moreover, it is assumed that the priority level of each service is higher in the order of C, A, and B.

A required run level is set for each service. The required run level corresponds to the priority level of the service. In the example illustrated in FIG. 2, the lower the required run level, the higher the priority level of the service. In addition, the number of replicas is set for each service. The "number of replicas" indicates the number of times of service deployment in each node 101. The deployed service runs as an instance in each node 101. That is, it can be said that the number of replicas is the number of instances.

Furthermore, a run level is set for each node 101. The run level is determined by the required run level for the service running in each node 101. In a case where the service is not running in the node 101, the run level of the node 101 is the lowest value (e.g., run level 0). The run level of each node 101 increases by the service being deployed. In one aspect, each node 101 may be set to a common run level (cluster run level), or may be set to an individual run level (node run level). A difference between the cluster run level and the node run level will be described later with reference to FIG. 3 and later.

Each service is deployed only to the node 101 running at a run level of equal to or higher than the required run level assigned to itself. In the example of FIG. 2, the node run levels of all the nodes 101A to 101D are initially 0. At this time, the service C is the only service whose required run level is equal to or less than 0. Therefore, currently, only the service C is deployable.

The run level of the node 101 to which the service is deployed increases on the basis of the required run level for the deployed service. For example, in a case where the service C is deployed to the node 101A, the run level of the node 101A increases to 1 (service C's required run level 0+1). In this manner, the run level of each node 101 increases as the service is deployed, and it becomes possible to deploy a service with a lower priority level (higher required run level). By the process, even in a case where there is dependency between a plurality of services, for example, the cluster system 100 is enabled to deploy each service in the order of eliminating the dependency.

Although the run level of the node 101 has been described to be the required run level for the deployed service+1 in the example illustrated in FIG. 2, a method of implementing the run level of the node 101 is not limited thereto. In one aspect, the run level of the node 101 may be equal to the required run level, or may be a run level obtained by adding optional calculation to the required run level.

In order to implement the process described above, the deployment manager 110 refers to the manifest file stored in the cluster metadata & state 114 to obtain the required run level and the number of replicas of each service. Furthermore, the deployment manager 110 sets a service launch filter in the cluster control plane 103 at least on the basis of the required run level. In one aspect, the deployment manager 110 may set the service launch filter in the cluster control plane 103 on the basis of the required run level and the run level. The filter may include the deployment rule described with reference to FIG. 2, for example.

The cluster control plane 103 can sequentially deploy services to any of the nodes 101 on the basis of the required run level by referring to the node run level stored in the node metadata & state 112 and the launch filter.

<C. First Procedure of Service Deployment>

Next, an exemplary first procedure of service deployment will be described with reference to FIGS. 3 to 6. Each of FIGS. 3 to 6 illustrates a change from the initial state of FIG. 2. In the first procedure, an individual run level (node run level) is set to each node 101. A mode that uses a node run level is called a node-based run level mode.

Furthermore, in the first procedure, the cluster system 100 sequentially or parallelly deploys services that satisfy deployment conditions regardless of the priority level. A mode for deploying, regardless of the priority level, services that satisfy the conditions in this manner is called a quick serve mode. In other words, the first procedure is a service deployment procedure using the node-based run level mode and the quick serve mode.

Figure 3:
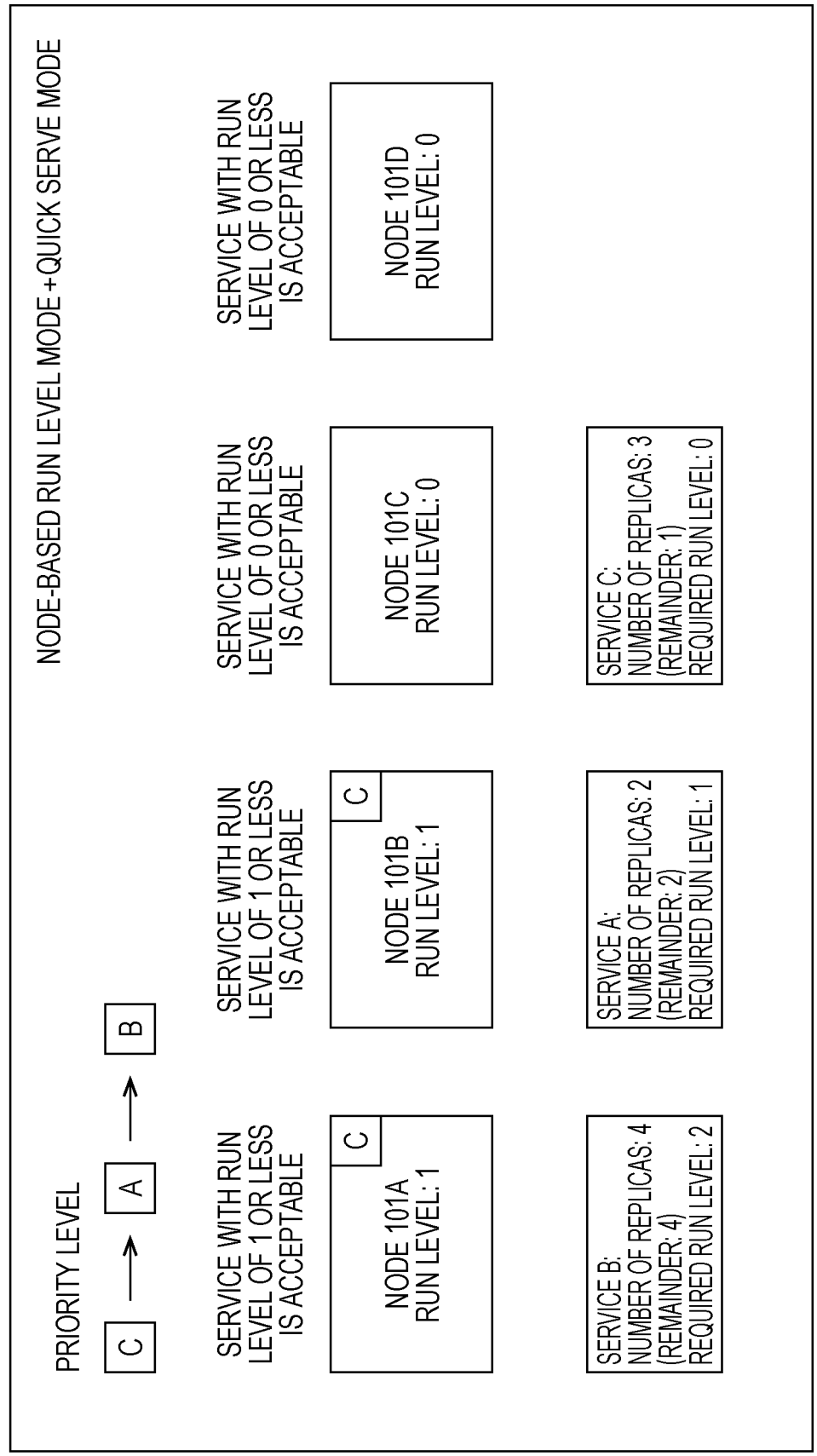
FIG. 3 is a diagram illustrating an example of a first state in a first procedure of service deployment.

FIG. 3 is a diagram illustrating an example of a first state in the first procedure of the service deployment. In the example illustrated in FIG. 3, the service C with the lowest required run level (highest priority level) is deployed to the nodes 101A and 101B from the initial state of FIG. 2.

In the initial state of FIG. 2, the run levels of all the nodes 101 are 0. In this case, the cluster system 100 can deploy, to all the nodes 101, only the service C with the required run level of equal to or less than 0.

The cluster system 100 can deploy the deployable service any number of times within the range of the number of replicas set in the deployable service (service C). For example, in the initial state of FIG. 2, the number of replicas of the service C is 3, and thus the cluster system 100 can deploy the service C up to three times.

The cluster system 100 deploys the service C to nodes 101A and 101B in the example illustrated in FIG. 3. In this case, the service C has been deployed twice, and thus the remaining number of replicas is 1. In other words, two instances of the service C are running in either node 101.

With the service C deployed to the nodes 101A and 101B, the run levels of the nodes 101A and 101B increase to 1 (service C's required run level 0+1). As a result, the run levels of the nodes 101A and 101B become equal to or more than 1, which is the required run level of the service A, and it becomes possible to deploy the service A to the nodes 101A and 101B.

Figure 4:
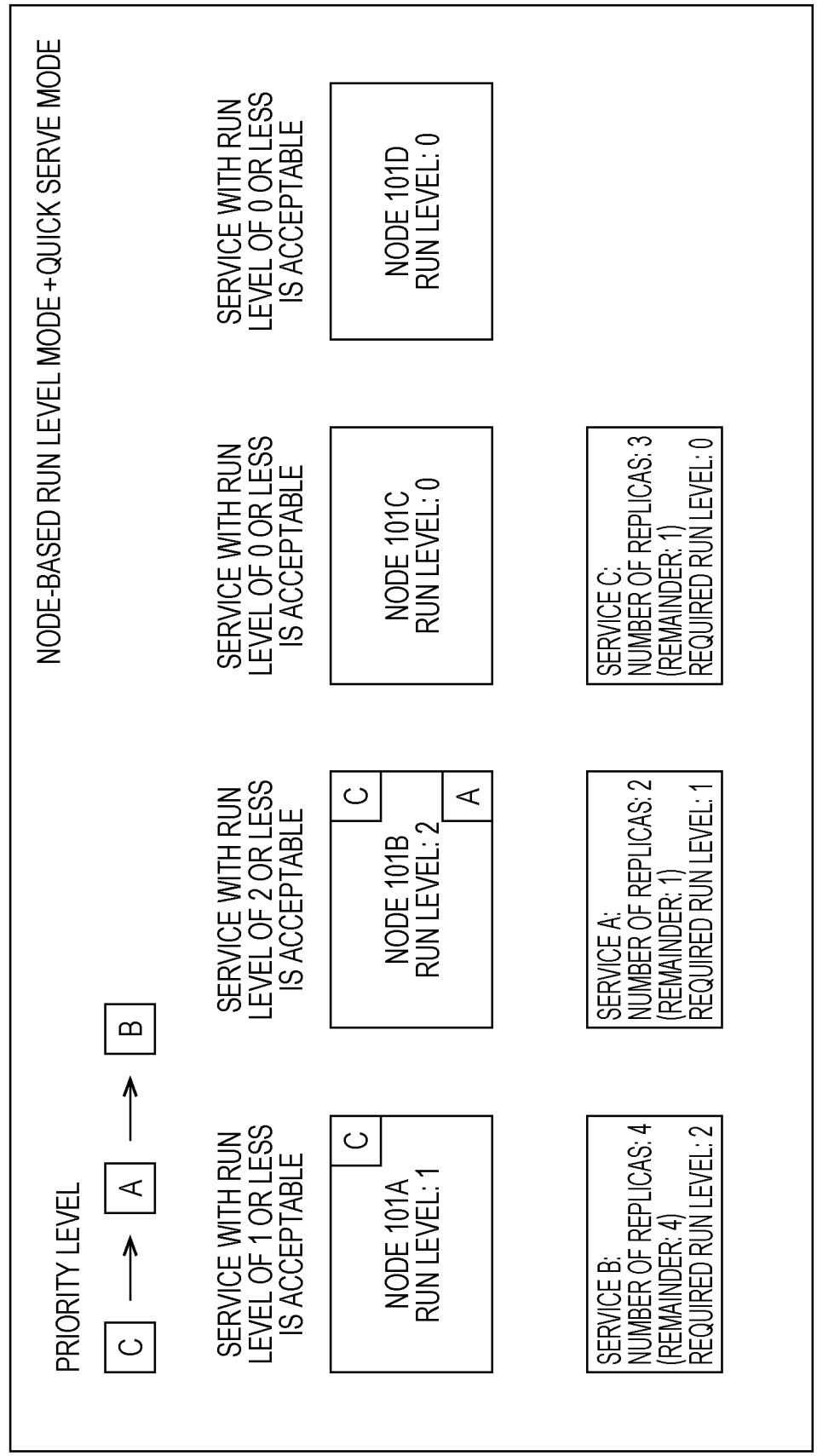
FIG. 4 is a diagram illustrating an example of a second state in the first procedure of service deployment.

FIG. 4 is a diagram illustrating an example of a second state in the first procedure of the service deployment. In the example illustrated in FIG. 4, the service A is further deployed to the node 101B from the first state of FIG. 3.

In the first state of FIG. 3, the run levels of the nodes 101A and 101B are 1, and the run levels of the nodes 101C and 101D are 0. In this case, the cluster system 100 can deploy, to the nodes 101A and 101B, the services A and C with the required run level of equal to or less than 1. Furthermore, the cluster system 100 can deploy, to the nodes 101C and 101D, the service C with the required run level of equal to or less than 0.

The cluster system 100 can deploy the deployable service any number of times within the range of the number of replicas set in the deployable service (services A and C). For example, in the first state of FIG. 3, the number of replicas of the service A is 2, and thus the cluster system 100 can deploy the service A up to twice. Furthermore, the service C has already been deployed twice, and thus the cluster system 100 can deploy the service C up to once, which is the remainder.

In the example illustrated in FIG. 4, the cluster system 100 deploys the service A to the node 101B. In this case, the service A has been deployed once, and thus the remaining number of replicas is 1. In other words, one instance of the service A is running in any of the nodes 101.

With the service A deployed to the node 101B, the run level of the node 101B increases to 2 (service A's required run level 1+1). As a result, the run level of the node 101B becomes equal to or more than 2, which is the required run level of the service B, and it becomes possible to deploy the service B to the node 101B.

Figure 5:
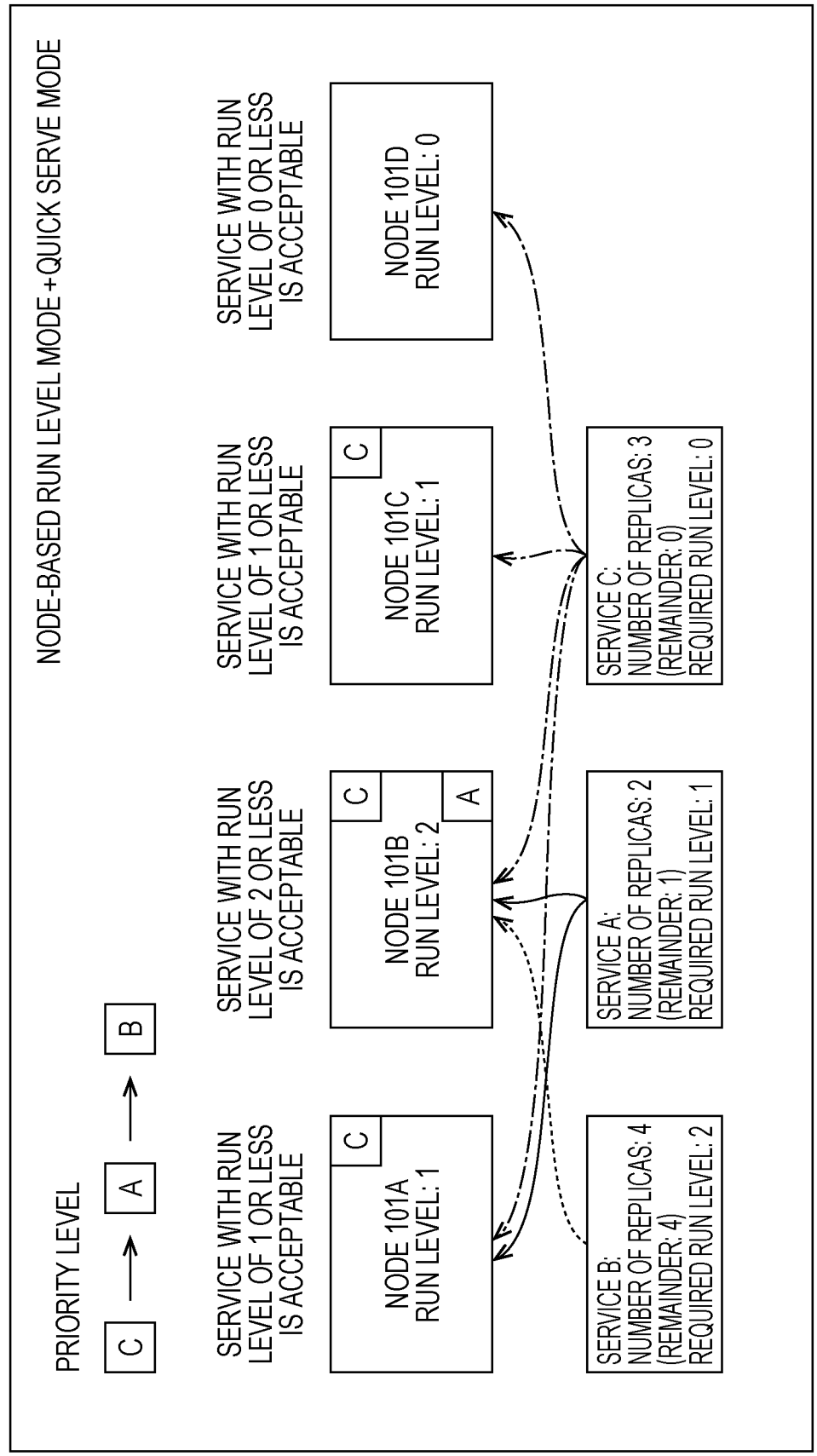
FIG. 5 is a diagram illustrating an example of a third state in the first procedure of service deployment.

FIG. 5 is a diagram illustrating an example of a third state in the first procedure of the service deployment. In the example illustrated in FIG. 5, the service C is further deployed to the node 101C from the second state of FIG. 4.

In the second state of FIG. 4, the run level of the node 101A is 1, the run level of the node 101B is 2, and the run levels of the nodes 101C and 101D are 0. In this case, the cluster system 100 can deploy, to the node 101A, the services A and C with the required run level of equal to or less than 1. Furthermore, the cluster system 100 can deploy, to the node 101B, the services A to C with the required run level of equal to or less than 2. Furthermore, the cluster system 100 can deploy, to the nodes 101C and 101D, the service C with the required run level of equal to or less than 0.

The cluster system 100 can deploy the deployable service any number of times within the range of the number of replicas set in the deployable service (services A to C). For example, in the second state of FIG. 4, the service A has already been deployed once, and thus the cluster system 100 can deploy the service A up to once, which is the remainder. Furthermore, the number of replicas of the service B is 4, and thus the cluster system 100 can deploy the service B up to four times. Furthermore, the service C has already been deployed twice, and thus the cluster system 100 can deploy the service C up to once, which is the remainder.

In the example illustrated in FIG. 5, the cluster system 100 deploys the service C to the node 101C. In this case, the service C has been deployed three times in total, and thus the remaining number of replicas is 0.

With the service C deployed, the run level of the node 101C increases to 1 (service C's required run level 0+1). As a result, the run level of the node 101C becomes equal to or more than 1, which is the required run level of the service A, and it becomes possible to deploy the service A to the node 101C. In this state, as illustrated in FIG. 5, the service B is deployable to the node 101B, the service A is deployable to the nodes 101A and 101B, and the service C is deployable to the nodes 101A to 101D.

Figure 6:
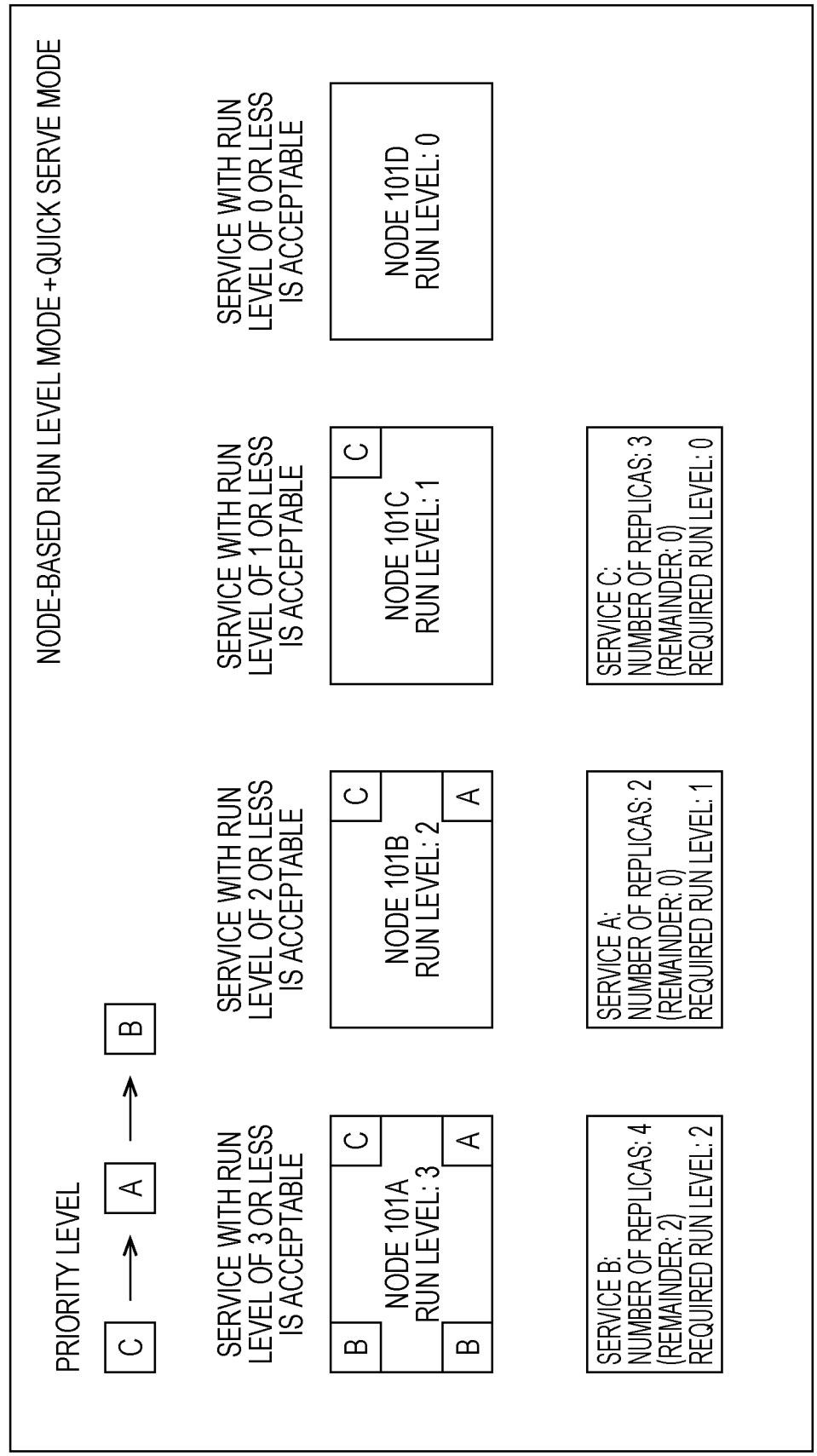
FIG. 6 is a diagram illustrating an example of a fourth state in the first procedure of service deployment.

FIG. 6 is a diagram illustrating an example of a fourth state in the first procedure of the service deployment. In the example illustrated in FIG. 6, the services A and B are further deployed to the node 101A from the third state of FIG. 5.

In the third state of FIG. 5, the run levels of the nodes 101A and 101C are 1, the run level of the node 101B is 2, and the run level of the node 101D is 0. In this case, the cluster system 100 can deploy, to the nodes 101A and 101C, the services A and C with the required run level of equal to or less than 1. Furthermore, the cluster system 100 can deploy, to the node 101B, the services A to C with the required run level of equal to or less than 2. Furthermore, the cluster system 100 can deploy, to the node 101D, the service C with the required run level of equal to or less than 0.

The cluster system 100 can deploy the deployable service any number of times within the range of the number of replicas set in the deployable service (services A to C). For example, in the third state of FIG. 5, the service A has already been deployed once, and thus the cluster system 100 can deploy the service A up to once, which is the remainder. Furthermore, the number of replicas of the service B is 4, and thus the cluster system 100 can deploy the service B up to four times. Furthermore, the service C has already been deployed twice, and thus the cluster system 100 can deploy the service C up to once, which is the remainder.

In the example illustrated in FIG. 6, the cluster system 100 deploys the service C to the node 101C. In this case, the service C has been deployed three times in total, and thus the remaining number of replicas is 0. Furthermore, the cluster system 100 deploys the service A to the node 101A, and then deploys the service B to the node 101A twice. In this case, the service A has been deployed twice in total, and thus the remaining number of replicas is 0. In addition, the service B has been deployed twice in total, and thus the remaining number of replicas is 2.

With the service C deployed to the node 101C, the run level of the node 101C increases to 1 (service C's required run level 0+1). As a result, the run level of the node 101C becomes equal to or more than 1, which is the required run level of the service A, and it becomes possible to deploy the service A to the node 101C. Furthermore, with the services A and B deployed to the node 101A, the run level of the node 101A increases to 3 (service B's required run level 2+1). Thereafter, in a similar manner, the cluster system 100 compares the required run level of each service with the run level of each node 101 to sequentially deploy the deployable service to each node 101.

<D. Second Procedure of Service Deployment>

Next, an exemplary second procedure of service deployment will be described with reference to FIGS. 7 to 10. Each of FIGS. 7 to 10 illustrates a change from the initial state of FIG. 2. In the second procedure, a common run level (cluster run level) is set to each node 101. A mode that uses a cluster run level is called a cluster-based run level mode. In the cluster-based run level mode, a run level of each node 101 is determined by the highest required run level of the deployed services.

In addition, the cluster system 100 uses a quick serve mode in the second procedure. In other words, the second procedure is a service deployment procedure using the cluster-based run level mode and the quick serve mode.

Figure 7:
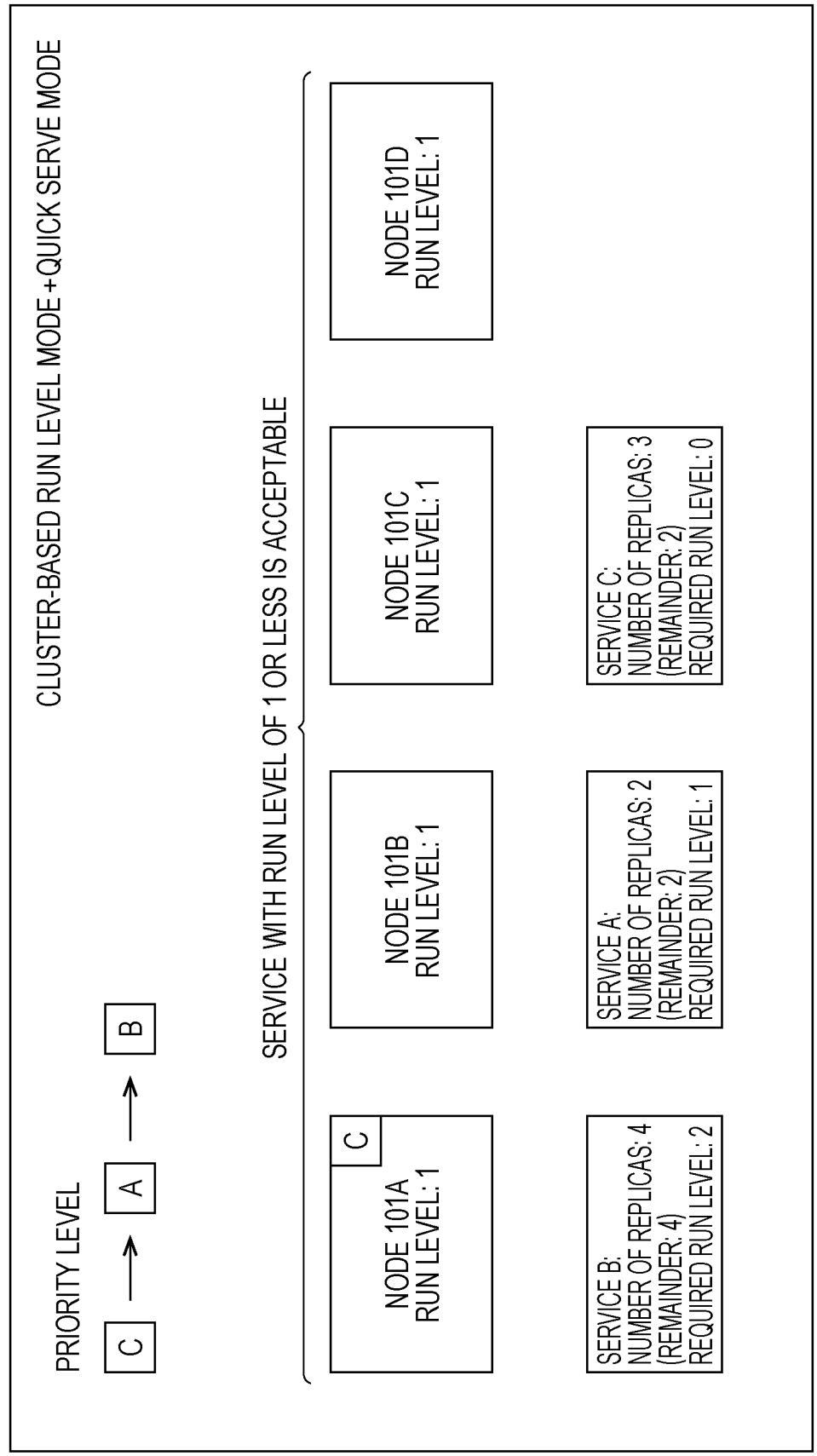
FIG. 7 is a diagram illustrating an example of a first state in a second procedure of service deployment.

FIG. 7 is a diagram illustrating an example of a first state in the second procedure of the service deployment. In the example illustrated in FIG. 7, the service C with the lowest required run level (highest priority level) is deployed to the nodes 101A from the initial state of FIG. 2.

In the initial state of FIG. 2, the run levels of all the nodes 101 are 0. In this case, the cluster system 100 can deploy, to all the nodes 101, the service C with the required run level of equal to or less than 0.

The cluster system 100 can deploy the deployable service any number of times within the range of the number of replicas set in the deployable service (service C). For example, in the initial state of FIG. 2, the number of replicas of the service C is 3, and thus the cluster system 100 can deploy the service C up to three times.

In the example illustrated in FIG. 7, the cluster system 100 deploys the service C to the node 101A. In this case, the service C has been deployed once, and thus the remaining number of replicas is 2. In other words, one instance of the service C is running in either node 101.

With the service C deployed, the service C has the highest required run level among the deployed services (only service C). In this case, unlike the first procedure, the run levels of all the nodes 101 increase to 1 (service C's required run level 0+1). As a result, the run levels of all the nodes 101 become equal to or more than 1, which is the required run level of the service A, and it becomes possible to deploy the service A to all the nodes 101.

Figure 8:
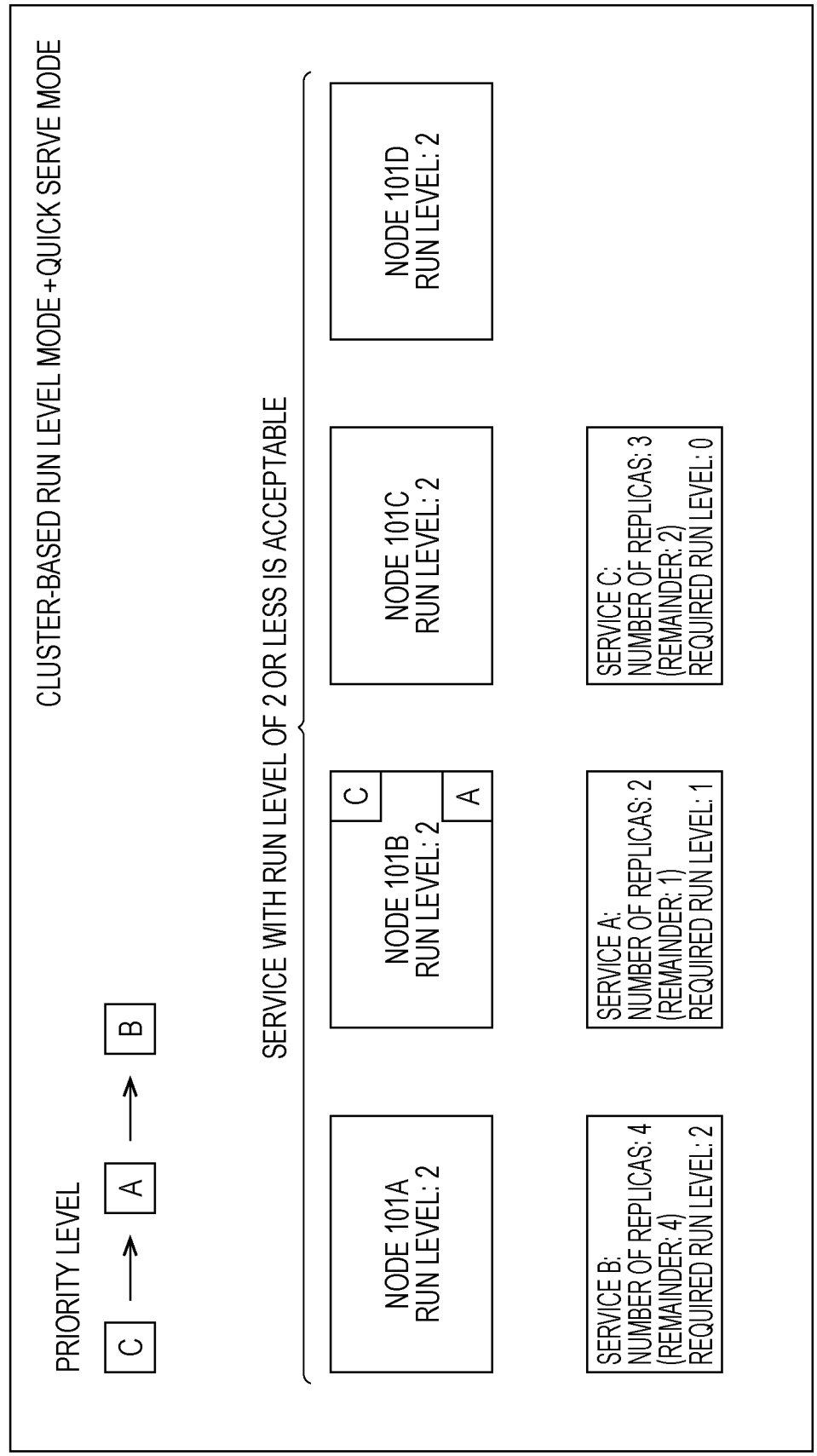
FIG. 8 is a diagram illustrating an example of a second state in the second procedure of service deployment.

FIG. 8 is a diagram illustrating an example of a second state in the second procedure of the service deployment. In the example illustrated in FIG. 8, the service A is further deployed to the node 101B from the first state of FIG. 7. In the first state of FIG. 7, the run levels of all the nodes 101 are 1. In this case, the cluster system 100 can deploy, to all the nodes 101, the services A and C with the required run level of equal to or less than 1.

The cluster system 100 can deploy the deployable service any number of times within the range of the number of replicas set in the deployable service (services A and C). For example, in the first state of FIG. 7, the number of replicas of the service A is 2, and thus the cluster system 100 can deploy the service A up to twice. Furthermore, the service C has already been deployed once, and thus the cluster system 100 can deploy the service C up to twice, which is the remainder. In the example illustrated in FIG. 8, the cluster system 100 deploys the service A to the node 101B. In this case, the service A has been deployed once, and thus the remaining number of replicas is 1.

With the service A deployed, the service A has the highest required run level among the deployed services (services A and C). Therefore, the run levels of all the nodes 101 increase to 2 (service A's required run level 1+1). As a result, the run levels of all the nodes 101 become equal to or more than 2, which is the required run level of the service B, and it becomes possible to deploy the service B to all the nodes 101.

Figure 9:
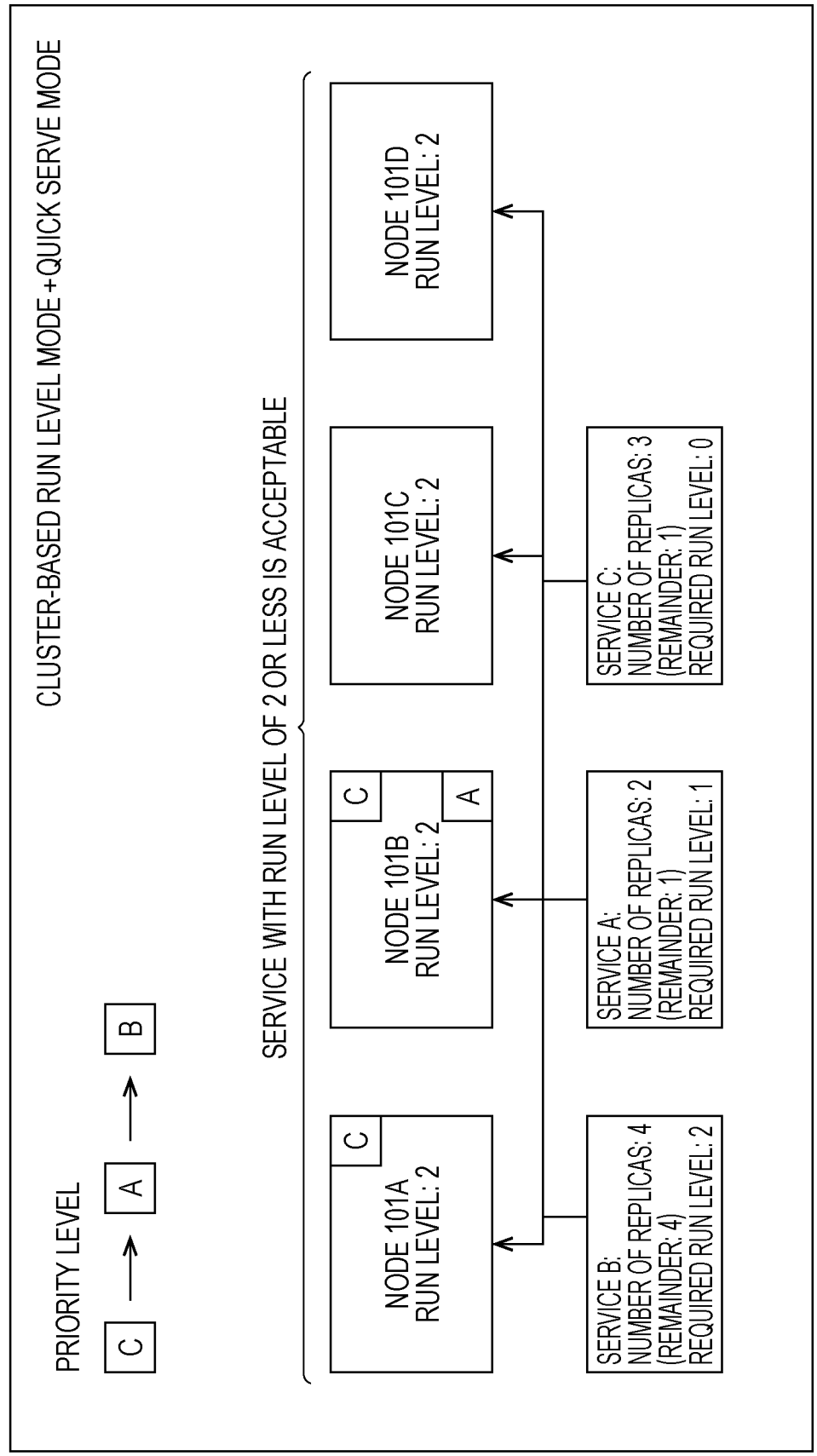
FIG. 9 is a diagram illustrating an example of a third state in the second procedure of service deployment.

FIG. 9 is a diagram illustrating an example of a third state in the second procedure of the service deployment. In the example illustrated in FIG. 9, the service C is further deployed to the node 101A from the second state of FIG. 8.

In the second state of FIG. 8, the run levels of all the nodes 101 are 2. In this case, the cluster system 100 can deploy, to all the nodes 101, the services A to C with the required run level of equal to or less than 2.

The cluster system 100 can deploy the deployable service any number of times within the range of the number of replicas set in the deployable service (services A to C). For example, in the second state of FIG. 8, the service A has already been deployed once, and thus the cluster system 100 can deploy the service A up to once, which is the remainder. Furthermore, the number of replicas of the service B is 4, and thus the cluster system 100 can deploy the service B up to four times. Furthermore, the service C has already been deployed once, and thus the cluster system 100 can deploy the service C up to twice, which is the remainder.

In the example illustrated in FIG. 9, the cluster system 100 deploys the service C to the node 101A. In this case, the service C has been deployed twice, and thus the remaining number of replicas is 1.

Even when the service C is newly deployed, the service A remains to be the one having the highest required run level among the deployed services (services A and C). Therefore, the run levels of all the nodes 101 do not change. In this state, all the services can be deployed to all the nodes 101 as illustrated in FIG. 9.

Figure 10:
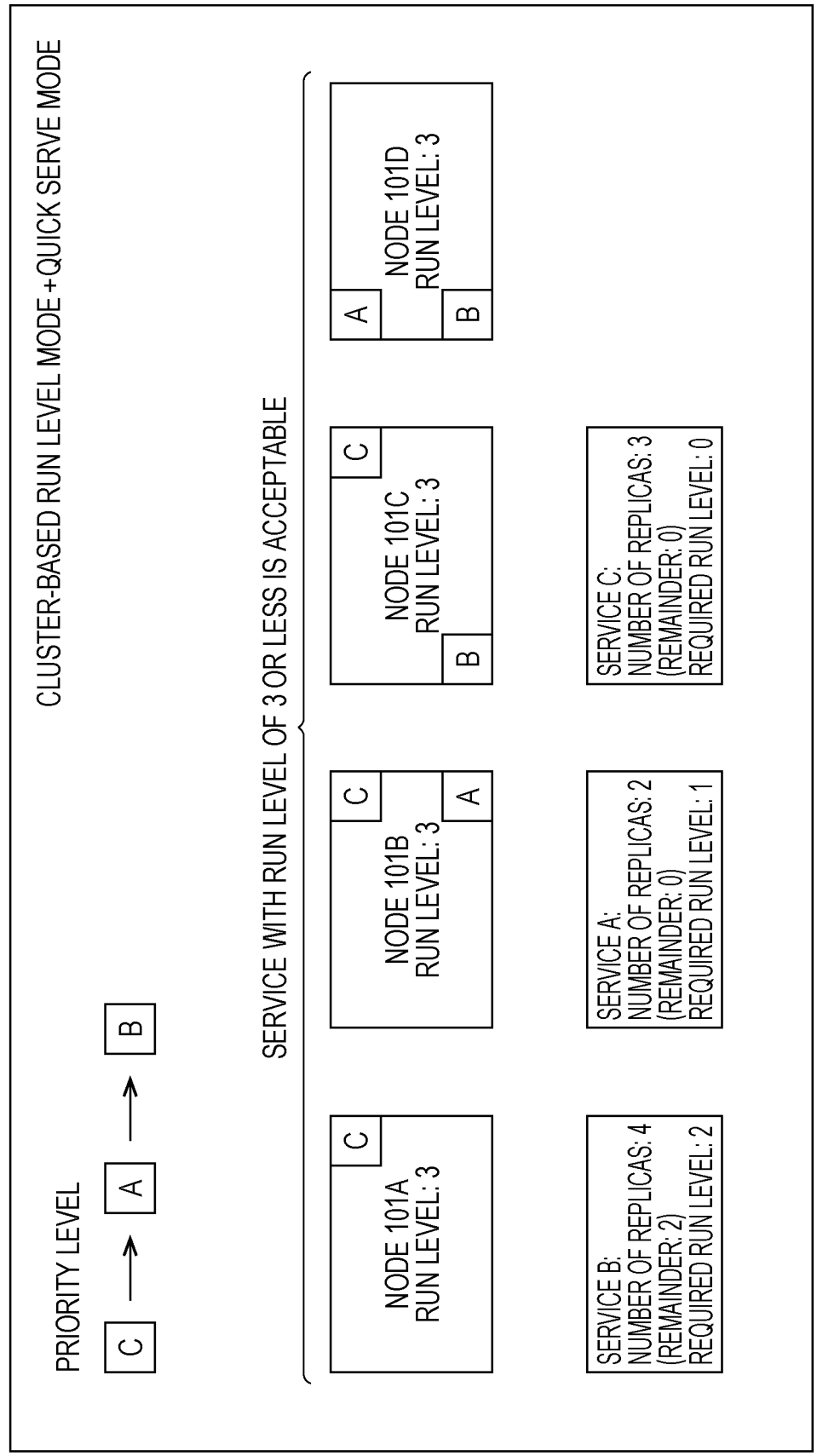
FIG. 10 is a diagram illustrating an example of a fourth state in the second procedure of service deployment.

FIG. 10 is a diagram illustrating an example of a fourth state in the second procedure of the service deployment. In the example illustrated in FIG. 10, the services B and C are further deployed to the node 101C, and the services A and B are deployed to the node 101D, respectively, from the third state of FIG. 9.

In the third state of FIG. 9, the run levels of all the nodes 101 are 2. In this case, the cluster system 100 can deploy, to all the nodes 101, the services A to C with the required run level of equal to or less than 2.

The cluster system 100 can deploy the deployable service any number of times within the range of the number of replicas set in the deployable service (services A to C). For example, in the third state of FIG. 9, the service A has already been deployed once, and thus the cluster system 100 can deploy the service A up to once, which is the remainder. Furthermore, the number of replicas of the service B is 4, and thus the cluster system 100 can deploy the service B up to four times. Furthermore, the service C has already been deployed twice, and thus the cluster system 100 can deploy the service C up to once, which is the remainder.

In the example illustrated in FIG. 10, the cluster system 100 deploys the services B and C to the node 101C, and deploys the services A and B to the node 101D, respectively. In this case, the service A has been deployed twice, and thus the remaining number of replicas is 0. Furthermore, the service B has been deployed twice, and thus the remaining number of replicas is 2. Furthermore, the service C has been deployed three times, and thus the remaining number of replicas is 0.

With the service B newly deployed, the service B has the highest required run level among the deployed services (services A and C). Therefore, the run levels of all the nodes 101 increase to 3 (service B's required run level 2+1). Thereafter, in a similar manner, the cluster system 100 compares the required run level of each service with the cluster run level to sequentially deploy the deployable service to each node 101.

<E. Third Procedure of Service Deployment>

Next, an exemplary third procedure of service deployment will be described with reference to FIGS. 11 to 14. Each of FIGS. 11 to 14 illustrates a change from the initial state of FIG. 2. In the third procedure, a cluster run level is set to each node 101.

In addition, in the third procedure, the cluster system 100 deploys the services with priority given to the service having a higher priority level (lower run level). A mode for performing deployment on the basis of the priority level (run level) is called a stable serve mode. In other words, the third procedure is a service deployment procedure using the cluster-based run level mode and the stable serve mode.

Figure 11:
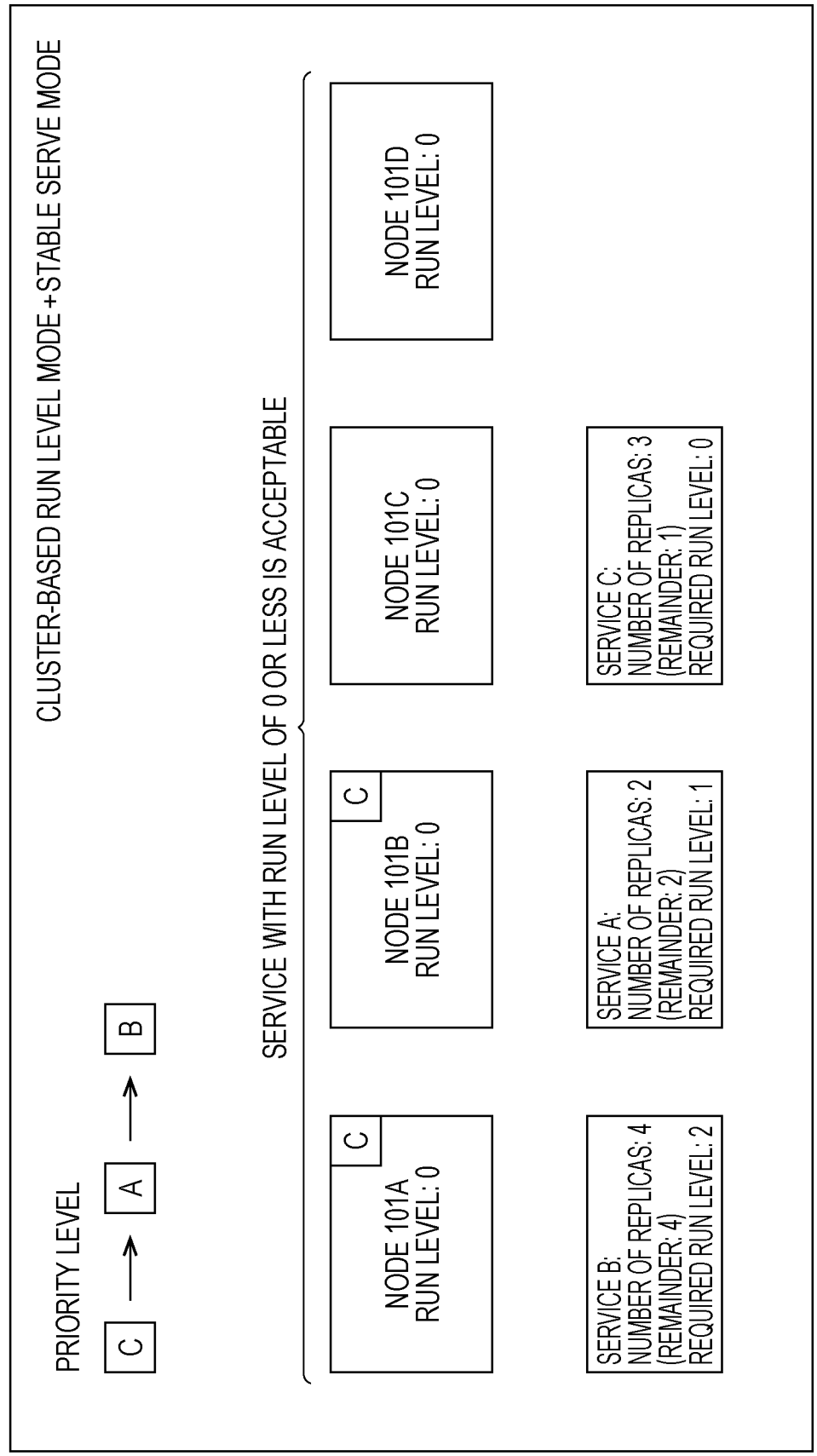
FIG. 11 is a diagram illustrating an example of a first state in a third procedure of service deployment.

FIG. 11 is a diagram illustrating an example of a first state in the third procedure of the service deployment. In the example illustrated in FIG. 11, the service C with the lowest required run level (highest priority level) is deployed to the nodes 101A and 101B from the initial state of FIG. 2.

In the stable serve mode, the run level of the node 101 is updated only in a case where the number of instances of the currently deployable service becomes equal to or more than the number of replicas. For example, the number of replicas of the service C is 3. Therefore, the run levels of all the nodes 101 increase to 1 (service C's required run level 0+1) when the number of instances (number of deployment) of the service C becomes equal to or more than 3. In the example illustrated in FIG. 11, the number of instances of the service C is 2, and the number of replicas of the service C is less than 3, and thus the run levels of all the nodes 101 remain 0.

Figure 12:
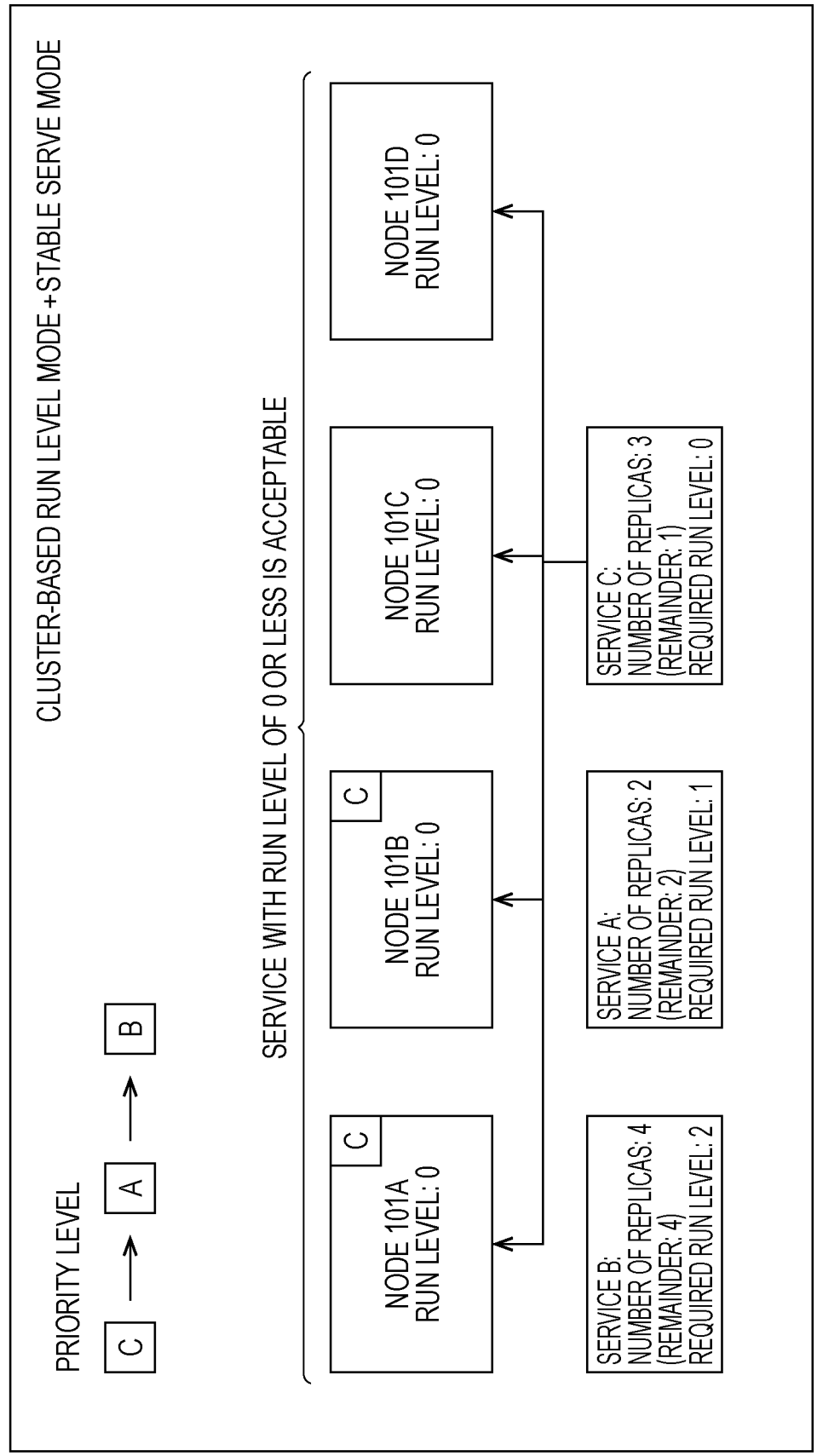
FIG. 12 is a diagram illustrating deployable services in the first state of FIG. 11.

FIG. 12 is a diagram illustrating deployable services in the first state of FIG. 11. The run levels of the nodes 101A to 101D are all 0, and thus only the service C satisfies the deployment requirements. The run levels of all the nodes 101 are the same, and thus the cluster system 100 can deploy the service C to any of the nodes 101. As illustrated in FIG. 12, in the stable serve mode, the service with the lowest required run level is deployed among the services that have not been deployed the number of times specified by the number of replicas, unlike the quick serve mode.

Figure 13:
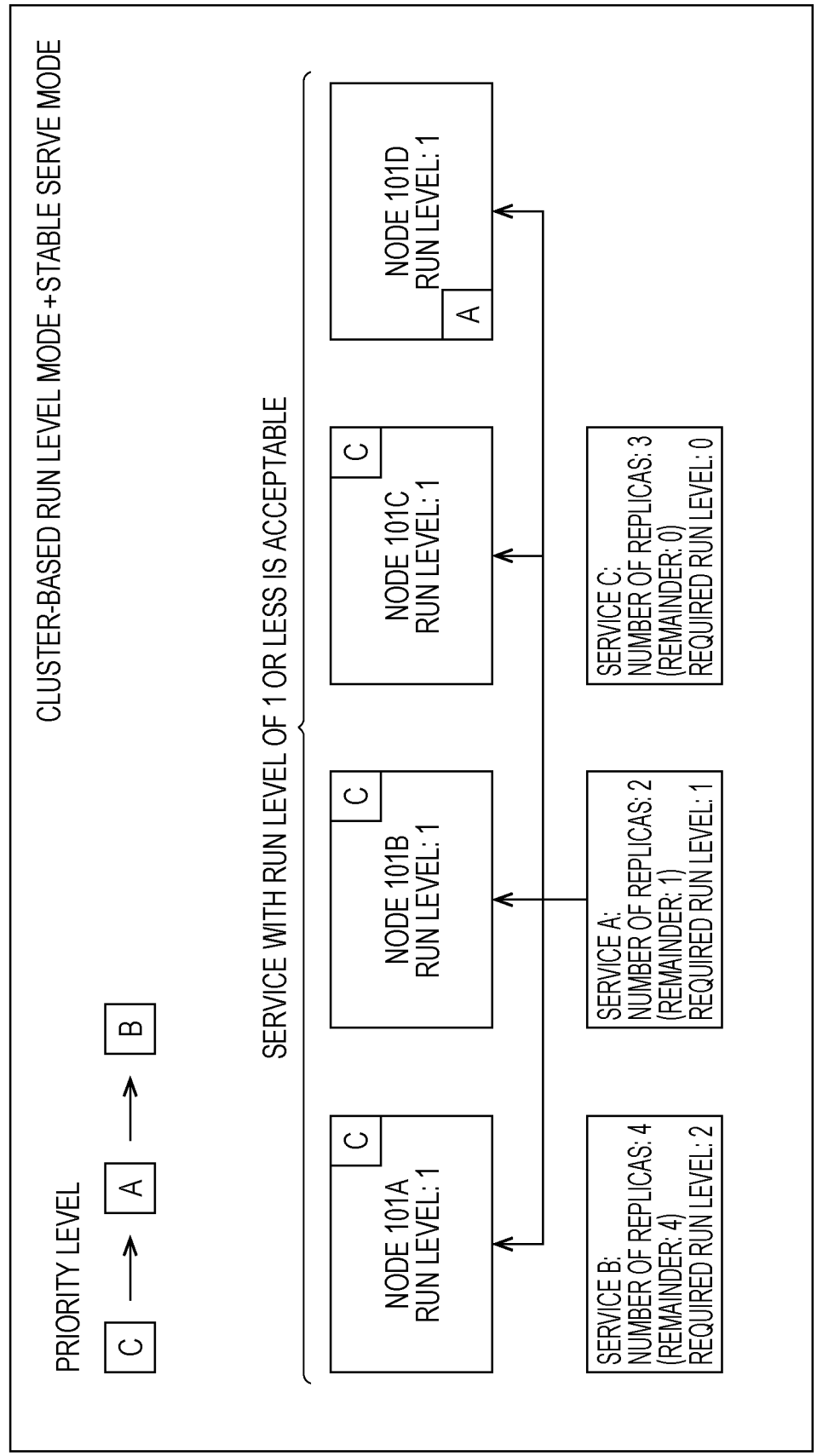
FIG. 13 is a diagram illustrating an example of a second state in the third procedure of service deployment.

FIG. 13 is a diagram illustrating an example of a second state in the third procedure of the service deployment. In the example illustrated in FIG. 13, from the first state of FIG. 11, the service C is further deployed to the node 101C, and then the service A is deployed to the node 101D.

In the second state of FIG. 13, the number of instances of the service C is 3, which is equal to or more than the number of replicas of the service C, which is 3. Furthermore, the number of instances of the service A is 1, which is less than the number of replicas of the service A, which is 2. Therefore, the run levels of all the nodes 101 are to be 1 (service C's required run level 0+1).

Figure 14:
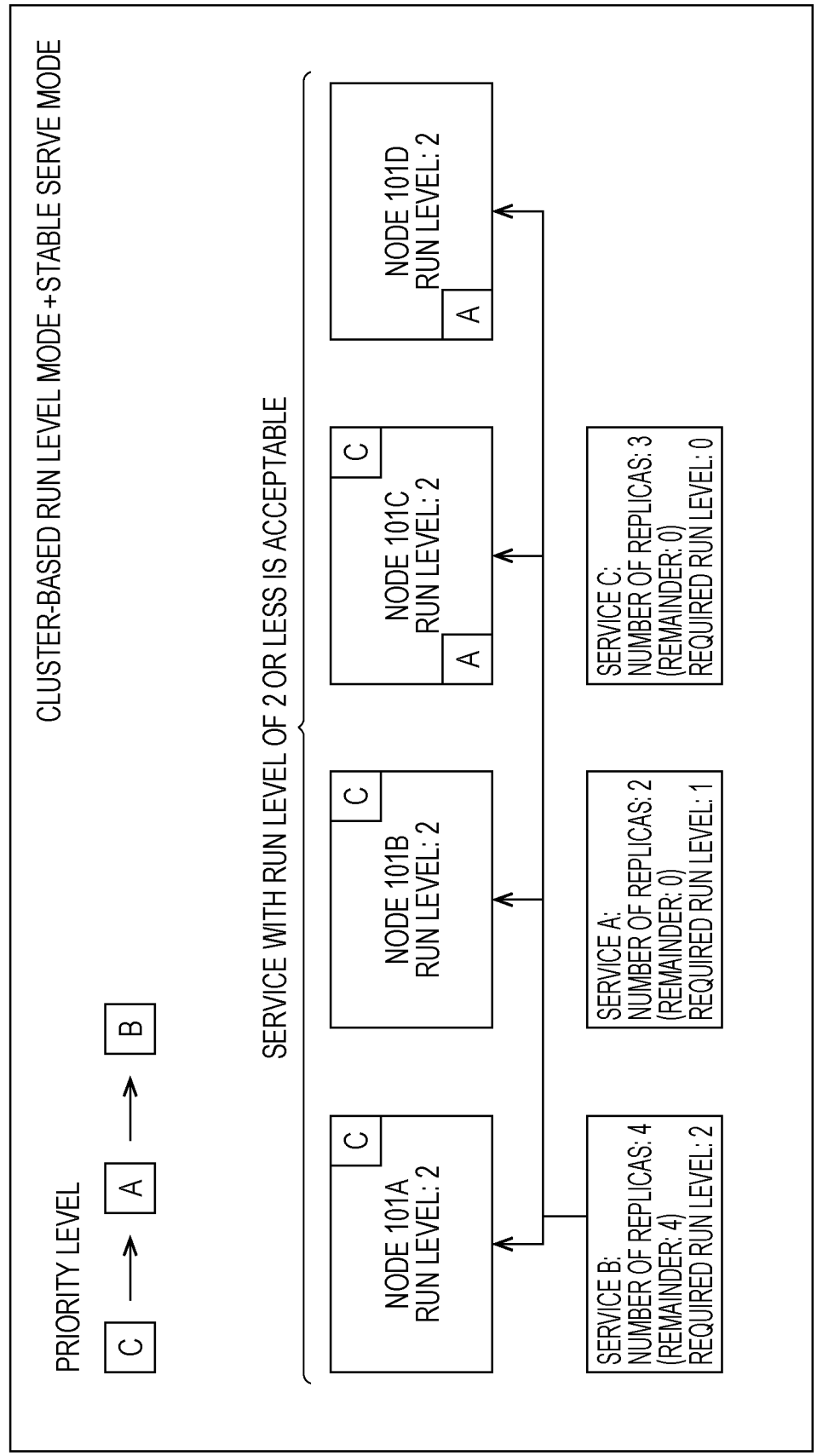
FIG. 14 is a diagram illustrating an example of a third state in the third procedure of service deployment.

FIG. 14 is a diagram illustrating an example of a third state in the third procedure of the service deployment. In the example illustrated in FIG. 13, the service A is further deployed to the node 101C from the second state of FIG. 13.

In the third state of FIG. 14, the number of instances of the service A is 2, which is equal to or more than the number of replicas of the service A, which is 2. Therefore, the run levels of all the nodes 101 are to be 2 (service A's required run level 1+1). With the run level of the node 101 increased, the cluster system 100 can deploy the service B to all the nodes 101. Thereafter, in a similar manner, the cluster system 100 compares the required run level of each service with the cluster run level to sequentially deploy the deployable service to each node 101.

As described above, as a method of setting a run level of the node 101, the cluster system 100 can use either the node-based run level mode or the cluster-based run level mode. In addition, as a method of deploying services, the cluster system 100 can use either the quick serve mode or the stable serve mode.

Furthermore, in addition to the first to third procedures described above, the cluster system 100 can deploy services on the basis of a fourth procedure in which the node-based run level mode and the stable serve mode are combined. Furthermore, the cluster system 100 can terminate the services running in the node 101 in sequence on the basis of the required run levels of the services. For example, the cluster system 100 may refer to the required run level of each service running in the node 101 to sequentially terminate the services in descending order of the required run level.

The cluster system 100 updates the run level of the node 101 when the service running in the node 101 is terminated. For example, it is assumed that each node 101 is operating in the node-based run level mode. In addition, it is assumed that the services A and C are running in the node 101A. In this case, the run level of the node 101A is 2. The cluster system 100 changes the run level of the node 101A to 1 when the service A running in the node 101A is terminated. Furthermore, as another example, it is assumed that each node 101 is operating in the cluster-based run level mode. In addition, it is assumed that the services A and C are running only in the node 101A, and no service is running in another node 101. In this case, the cluster system 100 terminates the service A running in the node 101A, and then changes the run levels of all the nodes 101 to 1.

While an exemplary case where a required run level of a service becomes lower as a priority level of the service becomes higher has been described in the descriptions with reference to FIGS. 2 to 14, the method of achieving the run level is not limited thereto. In one aspect, the higher the priority level of a service, the higher the required run level of the service may be. In that case, when the service is deployed to the node 101, the run level of the node 101 decreases on the basis of the required run level for the deployed service.

<F. Comparison of Modes>

Figure 15:
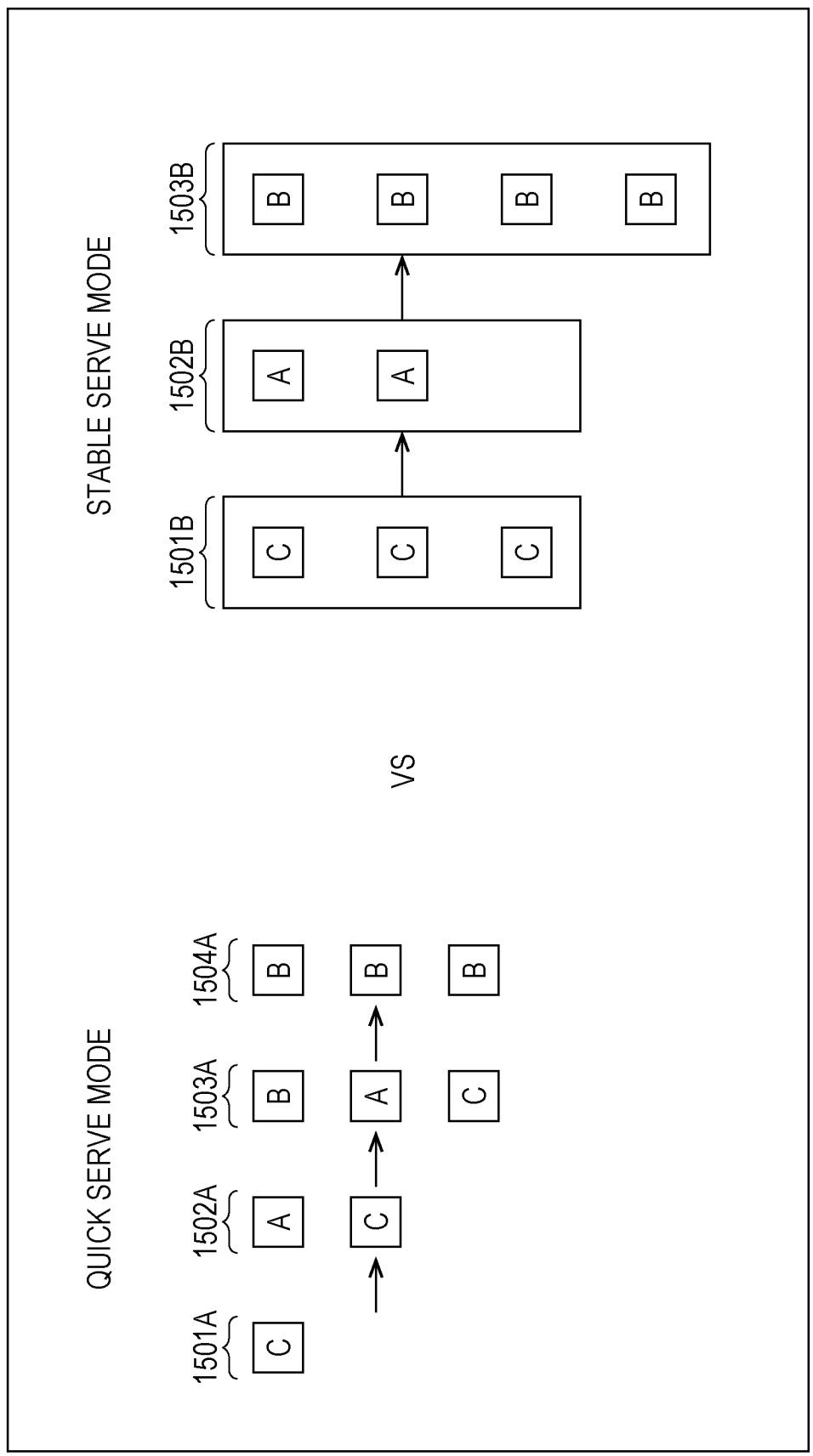
FIG. 15 is a diagram illustrating exemplary comparison between a quick serve mode and a stable serve mode.

FIG. 15 is a diagram illustrating exemplary comparison between the quick serve mode and the stable serve mode. States 1501A to 1504A illustrate an exemplary deployment status of each service in the quick serve mode. In addition, states 1501B to 1503B illustrate an exemplary deployment status of each service in the stable serve mode.

In the quick serve mode, the cluster system 100 can deploy the services that satisfy the deployment conditions regardless of the magnitude of the required run level. For example, the cluster system 100 can deploy the services A and B when a run level of any of the nodes 101 is equal to or higher than the required run level of the services A and B even if all the services C are not deployed.

On the other hand, in the stable serve mode, the cluster system 100 deploys services while invariably giving priority to a service with a lower required run level. For example, the cluster system 100 does not deploy the services A and B until the service C is deployed the number times specified by the number of replicas.

In the case of providing the user with some function using the services A to C in coordination with each other, the quick serve mode can quickly deploy all the services A to C, whereby the function can be provided to the user promptly. Meanwhile, the stable serve mode completes the service deployment while giving priority to a service with a lower required run level (higher priority level), whereby operation of the entire service tends to be stable.

Figure 16:
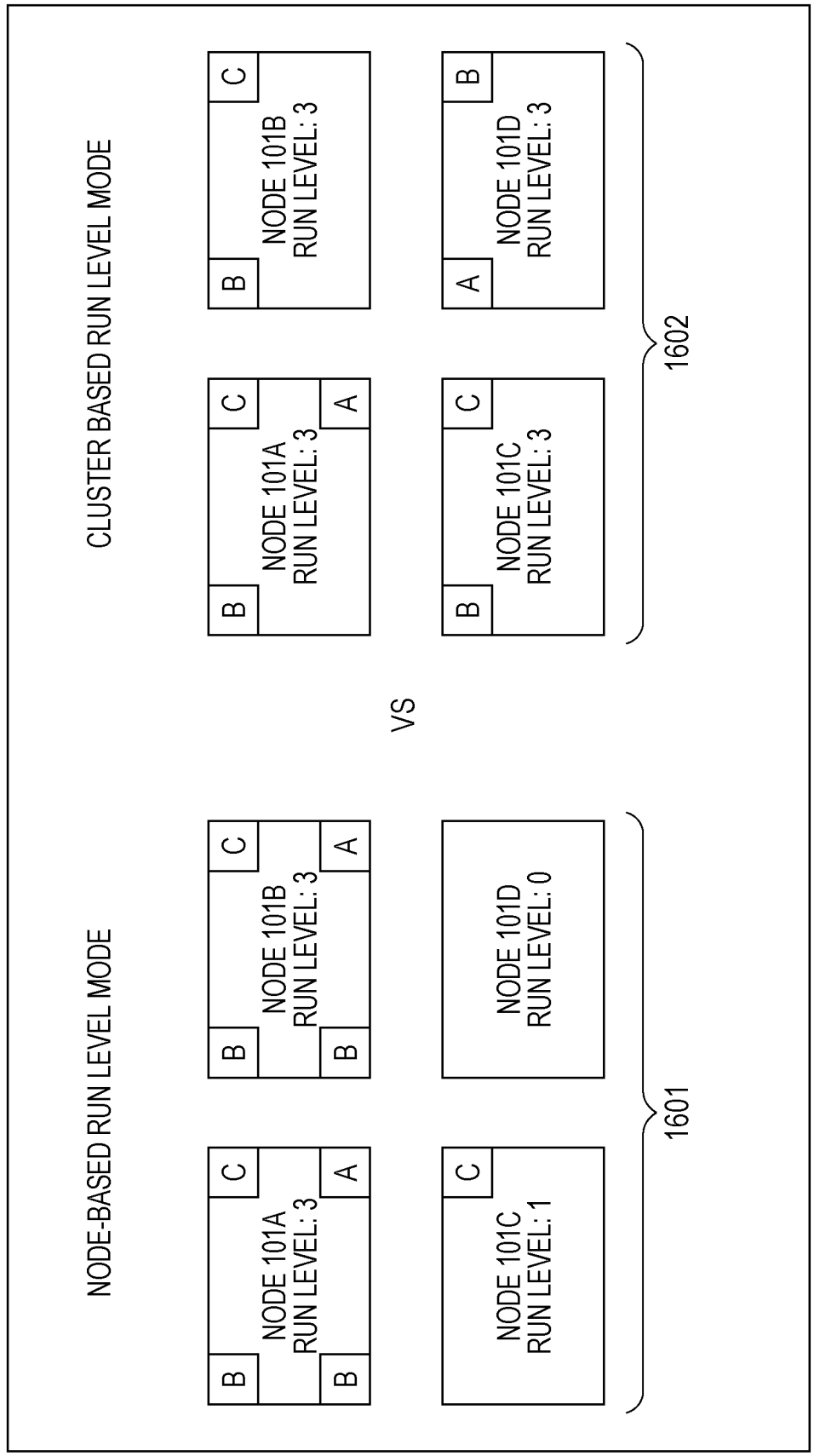
FIG. 16 is a diagram illustrating exemplary comparison between a node based run level mode and a cluster-based run level mode.

FIG. 16 is a diagram illustrating exemplary comparison between the node-based run level mode and the cluster-based run level mode. A deployment status 1601 illustrates an exemplary deployment status of each service in the node-based run level mode. A deployment status 1602 illustrates an exemplary deployment status of each service in the cluster-based run level mode.

In the node-based run level mode, the cluster system 100 sets an individual run level for each node 101. Accordingly, the run level of the node 101 to which the service is deployed is higher than run levels of other nodes 101 to which no service is deployed. While the cluster system 100 can also deploy a service with a high required run level to the node 101 to which the service is deployed, it remains incapable of deploying a service with a high required run level to the other nodes 101 to which no service is deployed. As a result, services tend to be intensively deployed to a particular node 101.

In the cluster-based run level mode, a common run level is set for each node 101. Accordingly, no matter which node 101 the service is deployed to, the run levels of all the nodes 101 remain the same. Therefore, there is no difference in the services that can be deployed to each node 101 at all times. As a result, services tend to be deployed to each node 101 in a distributed manner.

By operating in the node-based run level mode, the cluster system 100 can reduce the communication load between the nodes 101 by, for example, intensively deploying related services to the same node 101. In addition, by operating in the cluster-based run level mode, the cluster system 100 can reduce the processing load of each node 101 by, for example, arranging services having the same function to a plurality of nodes 101 in a distributed manner.

<G. Manifest File and Node Metadata>

Figure 17:
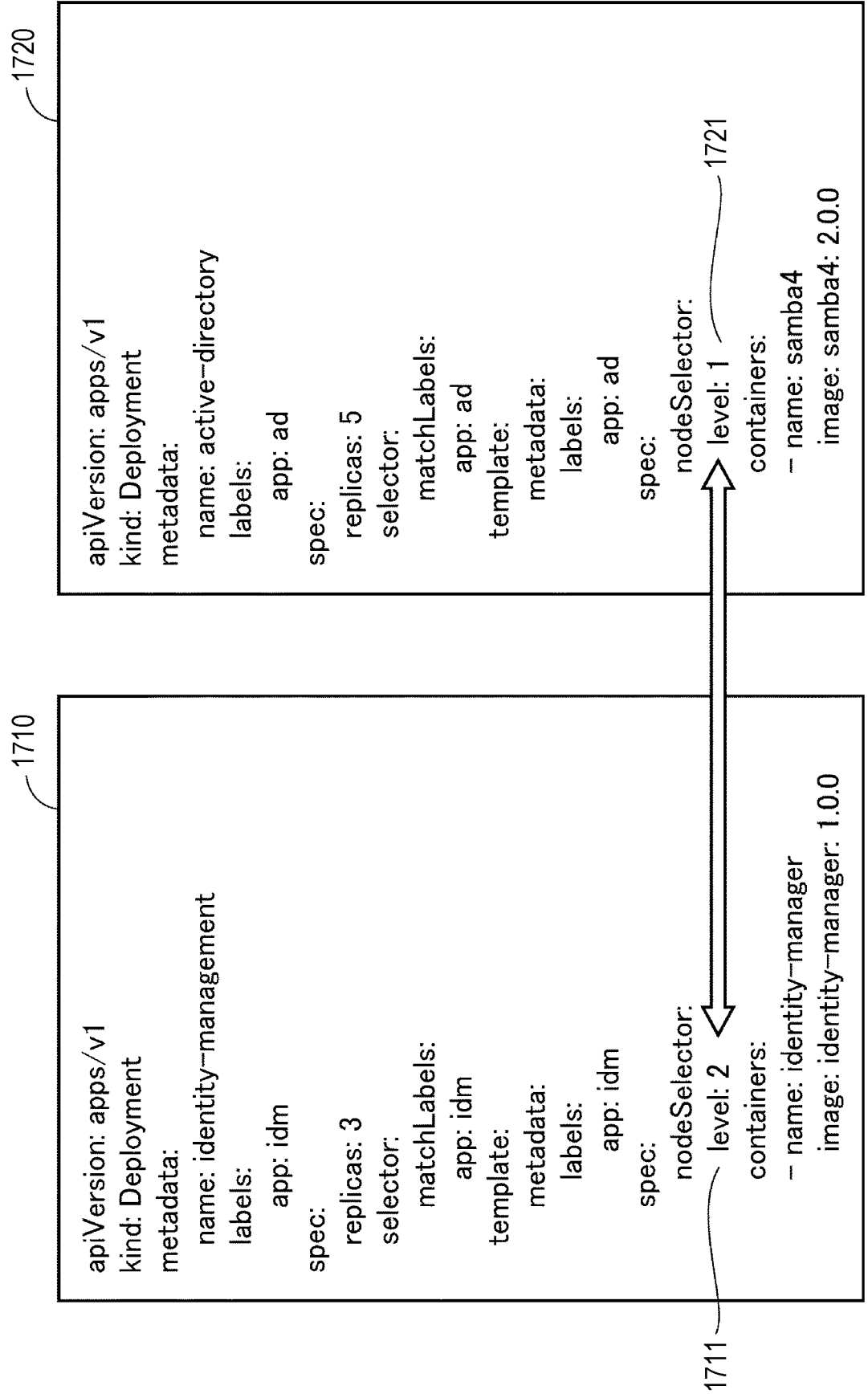
FIG. 17 is a diagram illustrating an exemplary manifest file.

FIG. 17 is a diagram illustrating an exemplary manifest file. A manifest file 1710 is a manifest file for identity-management, which is one of the services. A manifest file 1720 is a manifest file for an active-directory, which is one of the services. Each manifest file contains various kinds of information such as a required run level of a service and the number of replicas.

The identity management refers to the active directory. Accordingly, a required run level 1721 of the active directory is lower than a required run level 1711 of the identity management.

Figure 18:
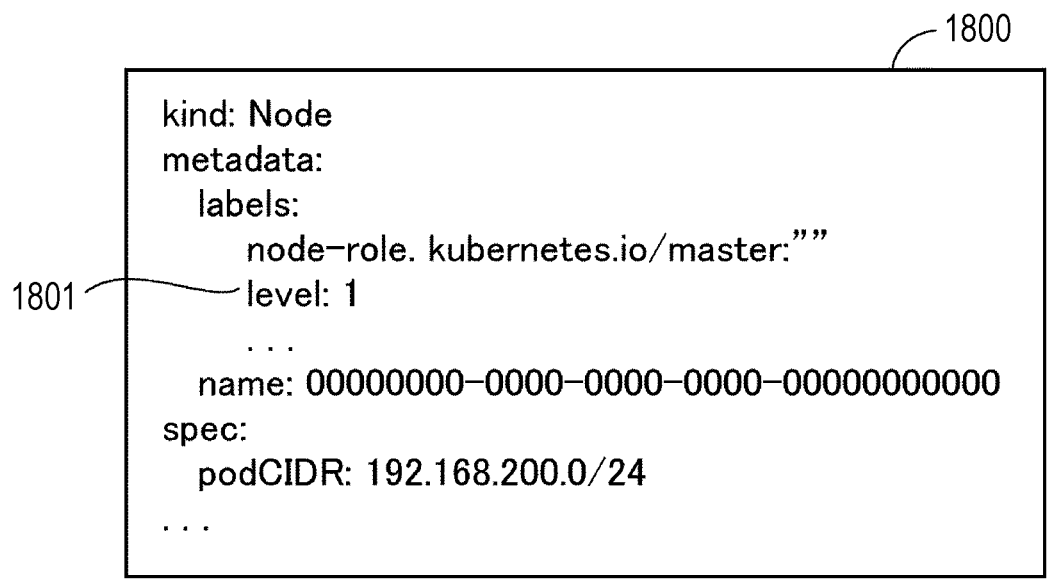
FIG. 18 is a diagram illustrating exemplary metadata set in each node.

FIG. 18 is a diagram illustrating exemplary metadata 1800 set in each node 101. The metadata 1800 contains a label set to each node 101 and a current run level 1801. In one aspect, the node metadata & state 112 may store the metadata 1800. In another aspect, when the run level 1801 contained in the metadata 1800 is the cluster run level, the cluster metadata & state 114 may store the metadata 1800.

Figure 19:
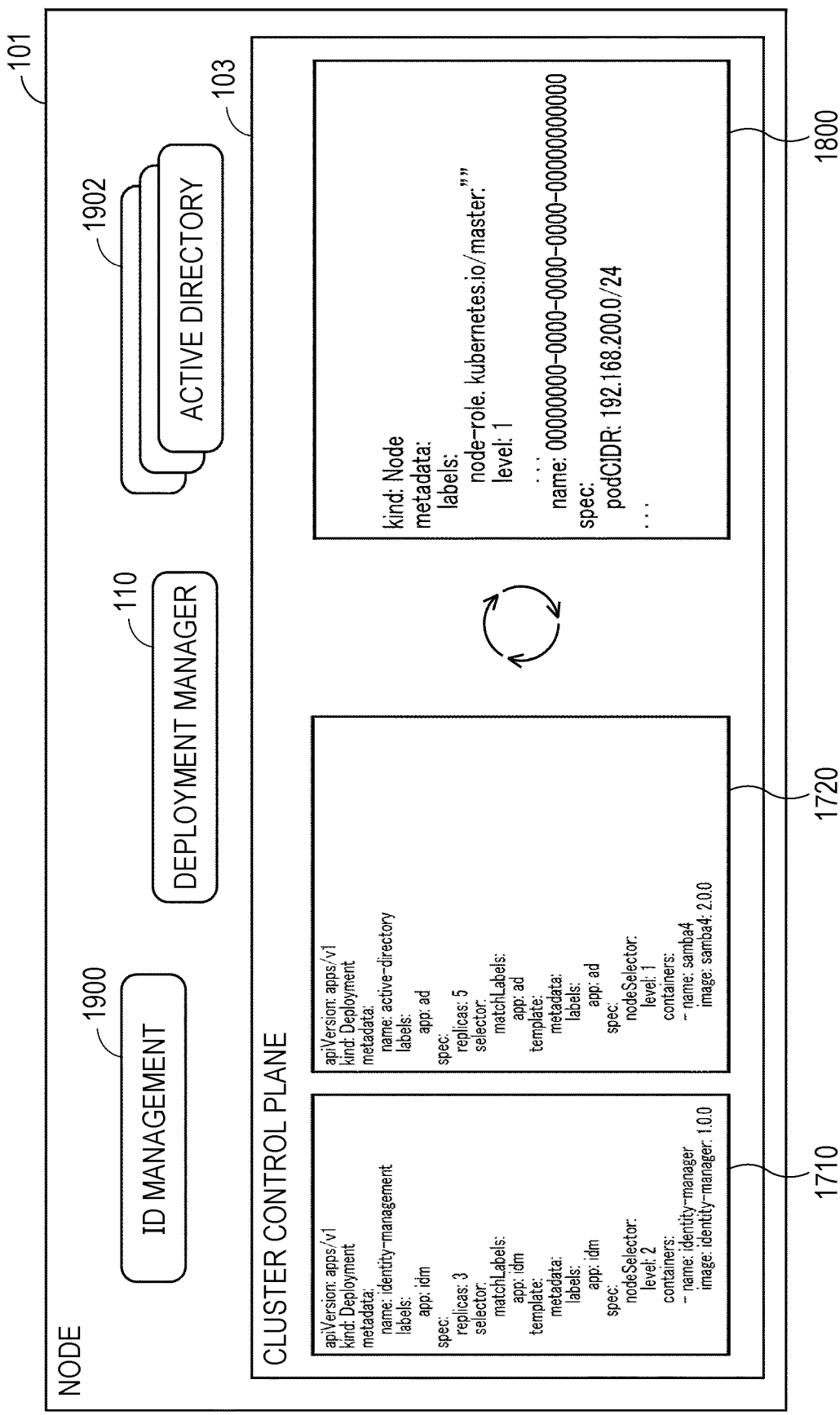
FIG. 19 is a diagram illustrating exemplary operation of a deployment manager.

FIG. 19 is a diagram illustrating exemplary operation of the deployment manager 110. The deployment manager 110 refers to the manifest files 1710 and 1720 and all or a part of the metadata 1800 of the node 101, and sets a filter in the cluster control plane 103. The filter contains various kinds of information for controlling the service deployment order.

The cluster control plane 103 deploys or terminates each service according to the filter on the basis of the required run level. Furthermore, the cluster control plane 103 also updates the run level of the metadata 1800 of the node 101 with the execution of service deployment or termination. In the example illustrated in FIG. 19, the deployment manager 110 sets a filter in the cluster control plane 103 in such a manner that an active directory 1902 and an identity management 1900 are deployed in that order.

As described above, the deployment manager 110 sets a filter in the cluster control plane 103 on the basis of the manifest files 1710 and 1720 and the metadata 1800 of the node 101. This feature allows the cluster control plane 103 to deploy or terminate services having dependency in an appropriate order.

<H. Flowchart>

Figure 20:
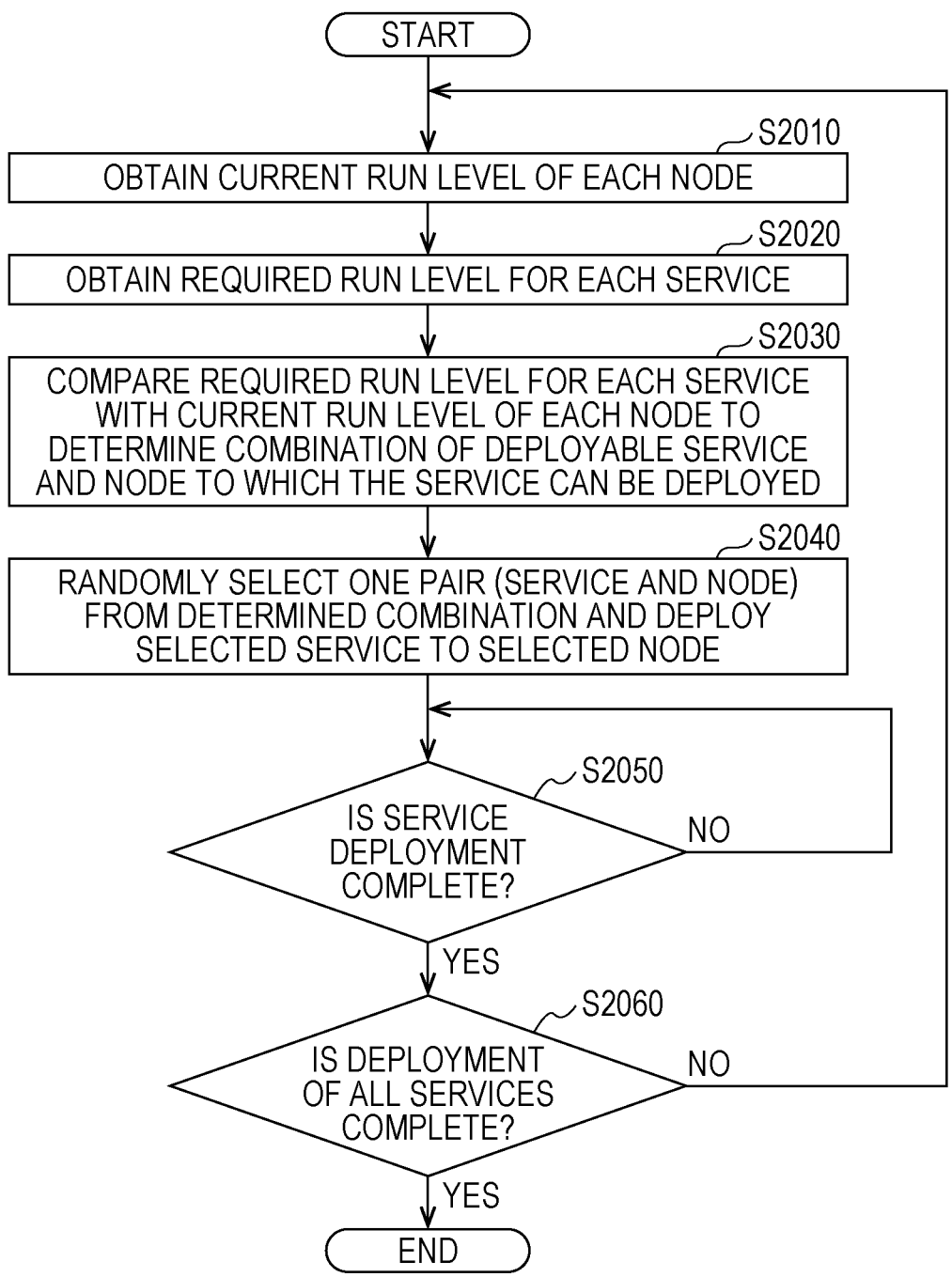
FIG. 20 is a diagram illustrating an exemplary flowchart of a service deployment process of the cluster system.

FIG. 20 is a diagram illustrating an exemplary flowchart of a service deployment process of the cluster system 100. Each processing in FIG. 20 can be implemented by mutual coordination among the deployment manager 110, the cluster runtime component 111, and the cluster management component 113 illustrated in FIG. 1. In one aspect, the cluster management component 113 may refer to the filter set by the deployment manager 110 to execute the following process.

In step S2010, the cluster system 100 obtains the current run level of each node 101. In one aspect, the cluster system 100 may obtain the node run level of each node 101 from the node metadata & state 112. In another aspect, the cluster system 100 may obtain the cluster run level common to all the nodes 101 from the cluster metadata & state 114.

In step S2020, the cluster system 100 obtains the required run level for each service. More specifically, the cluster system 100 obtains the required run level by referring to the manifest file of each service.

In step S2030, the cluster system 100 compares the required run level for each service with the current run level of each node 101 to determine a combination of a deployable service and the node 101 to which the service can be deployed. There may be a plurality of the combinations.

In step S2040, the cluster system 100 randomly selects a pair of the service and the node 101 from the combinations determined in step S2030. The cluster system 100 deploys the selected service to the selected node 101. In one aspect, the cluster system 100 may select a pair of the service and the node 101 on the basis of a priority level of the service and/or a load on the node 101, for example.

In step S2050, the cluster system 100 determines whether or not the service deployment is complete. More specifically, for example, the cluster management component 113 may communicate with the cluster runtime component 111 to obtain the state of the service, thereby determining whether or not the service deployment is complete.

If the cluster system 100 determines that the service deployment is complete (YES in step S2050), it shifts the control to step S2060. Otherwise (NO in step S2050), the cluster system 100 repeats the processing of step S2050.

In step S2060, the cluster system 100 determines whether or not the deployment of all services is complete. Completion of the deployment of all services indicates a state where all services have been deployed the number of times set by the number of replicas on the basis of the manifest file of each service. If the cluster system 100 determines that the deployment of all services is complete (YES in step S2060), the process is terminated. Otherwise (NO in step S2060), the cluster system 100 shifts the control to step S2010.

Figure 21:
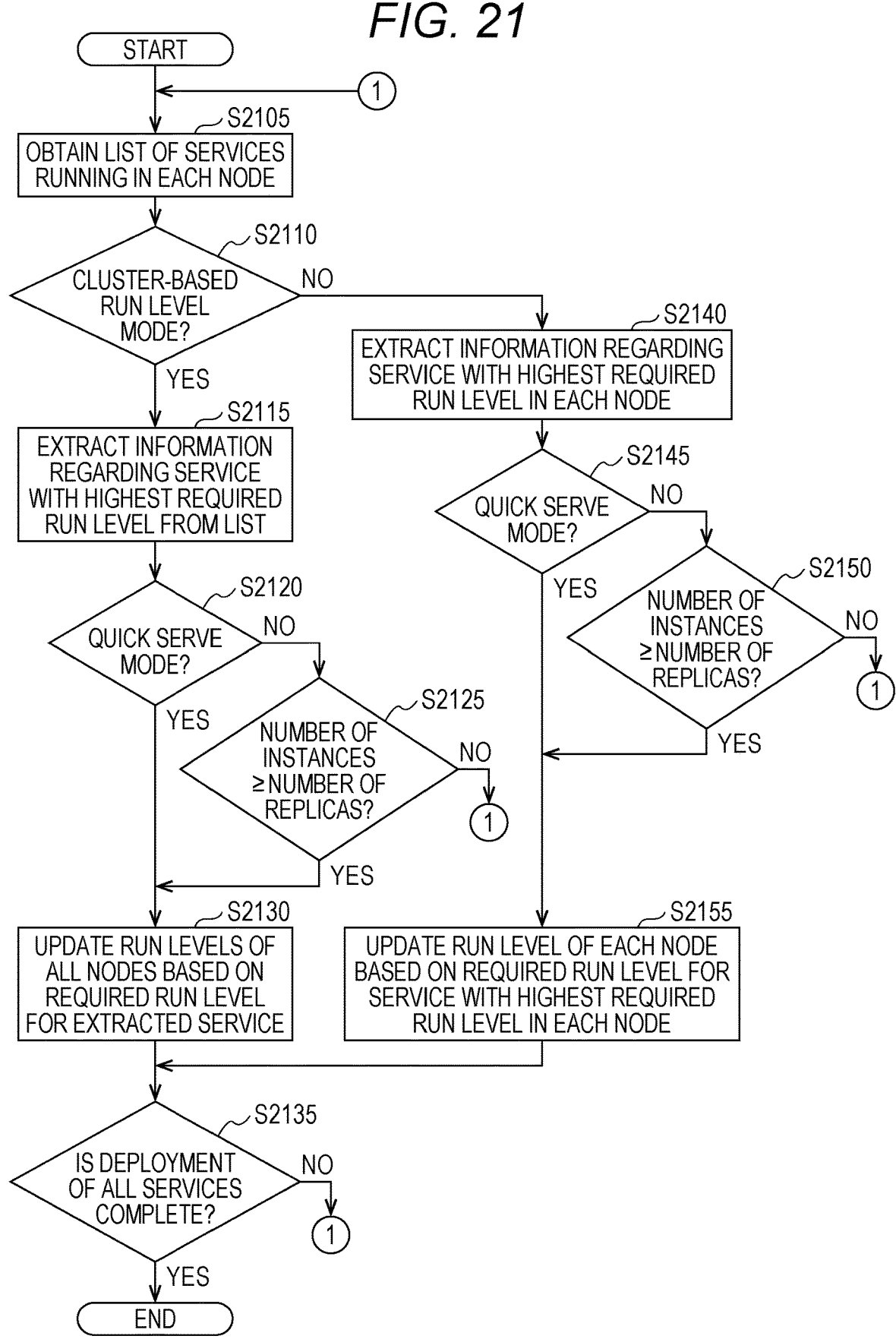
FIG. 21 is a diagram illustrating an exemplary flowchart of a run level update of each node in the cluster system.

FIG. 21 is a diagram illustrating an exemplary flowchart of a run level update of each node 101 in the cluster system 100. Each processing in FIG. 21 can be implemented by mutual coordination among the deployment manager 110, the cluster runtime component 111, and the cluster management component 113 illustrated in FIG. 1.

In one aspect, the cluster management component 113 may refer to the filter set by the deployment manager 110 to execute the following process. Furthermore, in another aspect, the cluster system 100 may execute the processes illustrated in FIGS. 20 and 21 in parallel or asynchronously.

In step S2105, the cluster system 100 obtains a list of services running in each node. In step S2110, the cluster system 100 determines whether the run level mode of the cluster system 100 is a cluster-based run level mode or a node-based run level mode. If the cluster system 100 determines that the run level mode of the cluster system 100 is the cluster-based run level mode (YES in step S2110), it shifts the control to step S2115. Otherwise (NO in step S2110), it shifts the control to step S2140.

In step S2115, the cluster system 100 extracts, from the list, information associated with the service with the highest required run level. Here, the service with the highest required run level indicates the service having the highest required run level among all the services currently deployed to any of the nodes 101.

In step S2120, the cluster system 100 determines whether the deployment mode of the cluster system 100 is a quick serve mode or a stable serve mode. If the cluster system 100 determines that the deployment mode of the cluster system 100 is the quick serve mode (YES in step S2120), it shifts the control to step S2130. Otherwise (NO in step S2120), the cluster system 100 shifts the control to step S2125.

In step S2125, the cluster system 100 determines whether or not the number of instances of the service whose information has been extracted in step S2115 is equal to or more than the number of replicas. That is, the cluster system 100 determines whether or not the service whose information has been extracted in step S2115 is deployed by the number of replicas described in the manifest file. If the cluster system 100 determines that the number of instances of the service whose information has been extracted in step S2115 is equal to or more than the number of replicas (YES in step S2125), it shifts the control to step S2130. Otherwise (NO in step S2125), the cluster system 100 shifts the control to step S2105.

In step S2130, the cluster system 100 updates the run levels of all the nodes 101 on the basis of the required run level of the service whose information has been extracted in step S2115. In step S2135, the cluster system 100 determines whether or not the deployment of all services is complete. If the cluster system 100 determines that the deployment of all services is complete (YES in step S2135), the process is terminated. Otherwise (NO in step S2135), the cluster system 100 shifts the control to step S2105.

In step S2140, the cluster system 100 extracts information associated with the service with the highest required run level in each node 101. For example, in a case where the cluster system 100 includes four nodes 101A to 101D, the cluster system 100 extracts four pieces of information associated with the service having the highest required run level of each node 101.

In step S2145, the cluster system 100 determines whether the deployment mode of the cluster system 100 is a quick serve mode or a stable serve mode. If the cluster system 100 determines that the deployment mode of the cluster system 100 is the quick serve mode (YES in step S2145), it shifts the control to step S2155. Otherwise (NO in step S2145), the cluster system 100 shifts the control to step S2150.

In step S2150, the cluster system 100 determines whether or not the number of instances of each service whose information has been extracted in step S2140 is equal to or more than the number of replicas. If the cluster system 100 determines that the number of instances of the service whose information has been extracted in step S2140 is equal to or more than the number of replicas (YES in step S2150), it shifts the control to step S2155. Otherwise (NO in step S2150), the cluster system 100 shifts the control to step S2105.

In step S2155, the cluster system 100 updates the run level of each node 101 running each service on the basis of the required run level of each service whose information has been extracted in step S2140.

<I. Hardware Configuration>

Figure 22:
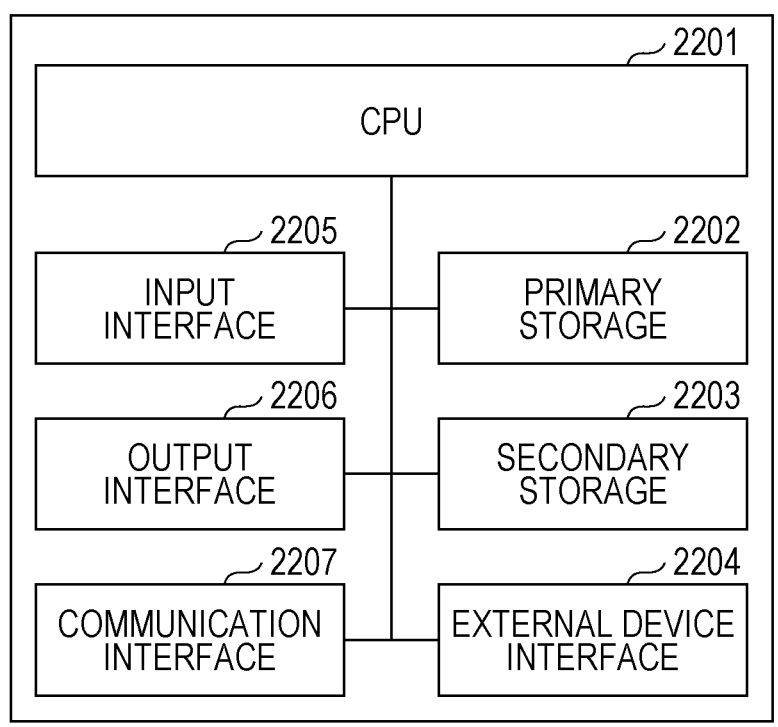
FIG. 22 is a diagram illustrating an example of a device included in the cluster system.

FIG. 22 is a diagram illustrating an example of a device 2200 included in the cluster system 100. The cluster system 100 may include one or more devices 2200. The device 2200 includes a central processing unit (CPU) 2201, a primary storage 2202, a secondary storage 2203, an external device interface 2204, an input interface 2205, an output interface 2206, and a communication interface 2207.

The CPU 2201 may execute a program for implementing various functions of the device 2200. The CPU 2201 includes, for example, at least one integrated circuit. The integrated circuit may include, for example, at least one CPU, at least one field programmable gate array (FPGA), or a combination thereof.

The primary storage 2202 stores the program to be executed by the CPU 2201, and data to be referenced by the CPU 2201. In one aspect, the primary storage 2202 may be constructed by a dynamic random access memory (DRAM), a static random access memory (SRAM), or the like.

The secondary storage 2203 is a non-volatile memory, and may store the program to be executed by the CPU 2201 and the data to be referenced by the CPU 2201. In that case, the CPU 2201 executes the program read from the secondary storage 2203 to the primary storage 2202, and refers to the data read from the secondary storage 2203 to the primary storage 2202. In one aspect, the secondary storage 2203 may be constructed by a hard disk drive (HDD), a solid state drive (SSD), an erasable programmable read only memory (EPROM), an electrically erasable programmable read only memory (EEPROM), a flash memory, or the like.

The external device interface 2204 may be connected to an optional external device such as a printer, a scanner, and an external HDD. In one aspect, the external device interface 2204 may be constructed by a universal serial bus (USB) terminal or the like.

The input interface 2205 may be connected to an optional input device such as a keyboard, a mouse, a touchpad, or a gamepad. In one aspect, the input interface 2205 may be constructed by a USB terminal, a PS/2 port, a Bluetooth (registered trademark) module, or the like.

The output interface 2206 may be connected to an optional output device such as a cathode-ray tube display, a liquid crystal display, or an organic electro-luminescence (EL) display. In one aspect, the output interface 2206 may be constructed by a USB terminal, a D-subminiature (D-sub) terminal, a digital visual interface (DVI) terminal, a high-definition multimedia interface (HDMI) (registered trademark) terminal, or the like.

The communication interface 2207 is connected to wired or wireless network equipment. In one aspect, the communication interface 2207 may be constructed by a wired local area network (LAN) port, a wireless fidelity (Wi-Fi) (registered trademark) module, or the like. In another aspect, the communication interface 2207 may transmit and receive data using a communication protocol such as Transmission Control Protocol/Internet Protocol (TCP/IP) and User Datagram Protocol (UDP).

In one aspect, the CPU 2201 may read a program for performing the process of FIGS. 20 and 21 from the secondary storage 2203 to the primary storage 2202 to execute the program. In another aspect, a part of or all of the process may also be implemented as a combination of circuit elements configured to execute the process.

Furthermore, in another aspect, all the constituent elements illustrated in FIG. 1 may be distributed and stored in the primary storage 2202 in one or more devices 2200 as a program or data.

As described above, the cluster system 100 according to the present embodiment can deploy or terminate services having dependency in an appropriate order on the basis of the manifest files 1710 and 1720 and the metadata 1800 of the node 101. With this function, the user does not need to prepare detailed scripts or the like to cause the cluster system 100 to deploy the services having dependency, and only needs to set a required run level in the manifest file of each service.

Moreover, the cluster system 100 can appropriately combine and use the node-based run level mode or the cluster-based run level mode, and the quick serve mode or the stable serve mode. With this function, as appropriate, the cluster system 100 can deploy each service intensively to a specific node 101, or deploy each service to a plurality of nodes 101 in a distributed manner.

Although embodiments of the present invention have been described and illustrated in detail, the disclosed embodiments are made for purposes of illustration and example only and not limitation. The scope of the present invention should not be interpreted by terms of the descriptions above but by terms of the appended claims, and it is intended to include all modifications in the meanings equivalent to and within the scope of the claims. In addition, it is intended that the contents of the disclosure described in the embodiment and each variation are implemented alone or in combination whenever possible.

What is claimed is:

1. A method for deploying a service to a cluster system, the method comprising:
   obtaining a first run level of a first node, the first run level being a highest required run level in one or more required run levels assigned to one or more services currently run by the first node;
   obtaining a second run level of a second node, the second run level being a highest required run level in one or more required run levels assigned to one or more services currently run by the second node;
   obtaining a required run level assigned to the service;
   comparing the required run level with the first and second run levels;
   determining whether or not the service is deployable to each of the first and second nodes on the basis of a result of the comparing; and
   updating at least one of the first and second run levels on the basis of deployment of the service to at least one of the first and second nodes.

2. The method according to claim 1, wherein
   the determining whether or not the service is deployable to each of the first and second nodes includes determining that the service is deployable to each of the first and second nodes on the basis of each run level of the first and second nodes being equal to or higher than the required run level for the service.

3. The method according to claim 1, further comprising:
   determining a termination order of one or a plurality of the services having been deployed on the basis of a run level of one or a plurality of the services having been deployed; and
   updating at least one of the first and second run levels on the basis of termination of at least one of one or a plurality of the services.

4. The method according to claim 1, wherein
   the first and second run levels are set to a node run level individual for each node, and
   the comparing the required run level with the first and second run levels includes individually executing comparison between the required run level and the first run level and comparison between the required run level and the second run level.

5. The method according to claim 4, wherein
   the updating at least one of the first and second run levels includes:
   updating the first run level on the basis of the required run level for the service having the highest required run level among one or a plurality of the services having been deployed to the first node; and
   updating the second run level on the basis of the required run level for the service having the highest required run level among one or a plurality of the services having been deployed to the second node.

6. The method according to claim 4, further comprising:
   obtaining a configuration of a number of replicas by referring to a configuration file of the service, wherein
   the updating at least one of the first and second run levels includes updating at least one of the first and second run levels on the basis of deploying the service that satisfies a deployment condition a number of times specified by the configuration of the number of replicas.

7. The method according to claim 1, wherein
   the first and second run levels are set to a cluster run level common in the cluster system, and
   the comparing the required run level with the first and second run levels includes comparing the required run level with the cluster run level.

8. The method according to claim 7, wherein
   the updating at least one of the first and second run levels includes updating the cluster run level on the basis of the required run level of the service having the highest required run level among one or a plurality of the services having been deployed to the first or second node.

9. The method according to claim 7, further comprising:
   obtaining a configuration of a number of replicas by referring to a configuration file of the service, wherein
   the updating at least one of the first and second run levels includes updating the cluster run level on the basis of deploying the service that satisfies a deployment condition a number of times specified by the configuration of the number of replicas.

10. The method according to claim 1, further comprising:
    deploying a management service for managing the required run level and the first and second run levels to either of the first and second nodes.

11. The method according to claim 10, further comprising:
    setting, according to the management service, a filter including a deployment condition of the service in a controller of the cluster system on the basis of the required run level.

12. The method according to claim 1, wherein
    the determining whether or not the service is deployable to each of the first and second nodes on the basis of a result of the comparing includes determining the service is deployable to both of the first and second nodes, the method further comprising:
    randomly selecting one of the first and second nodes to deploy the service to the selected one of the first and second nodes.

13. A non-transitory recording medium storing a computer readable program causing one or more processors to perform:
    the method according to claim 1.

14. A system comprising:
    one or more processors; and
    a memory that stores a program for causing the one or more processors to perform the method according to claim 1.

* * * * *